(12) United States Patent
Ramadorai et al.

(10) Patent No.: US 10,743,042 B2
(45) Date of Patent: Aug. 11, 2020

(54) TECHNIQUES FOR INTEGRATION OF MEDIA CONTENT FROM MOBILE DEVICE TO BROADCAST

(71) Applicant: Burst, Inc., Boston, MA (US)

(72) Inventors: Jayachandran Ramadorai, Newton, MA (US); Mark Kurtz, Medford, MA (US); Himanshu Roongta, Stoughton, MA (US)

(73) Assignee: Burst, Inc., Boston, MA (US)

( * ) Notice: Subject to any disclaimer, the term of this patent is extended or adjusted under 35 U.S.C. 154(b) by 0 days.

(21) Appl. No.: 15/922,216

(22) Filed: Mar. 15, 2018

(65) Prior Publication Data

US 2019/0090002 A1 Mar. 21, 2019

Related U.S. Application Data

(60) Provisional application No. 62/471,909, filed on Mar. 15, 2017.

(51) Int. Cl.
*H04N 21/2343* (2011.01)
*H04N 21/258* (2011.01)
*H04N 21/2743* (2011.01)
*H04N 21/81* (2011.01)

(52) U.S. Cl.
CPC ........... *H04N 21/234309* (2013.01); *H04N 21/23439* (2013.01); *H04N 21/234336* (2013.01); *H04N 21/234363* (2013.01); *H04N 21/234381* (2013.01); *H04N 21/25825* (2013.01); *H04N 21/25833* (2013.01); *H04N 21/25858* (2013.01); *H04N 21/2743* (2013.01); *H04N 21/8166* (2013.01)

(58) Field of Classification Search
CPC ..... H04N 21/234309; H04N 21/25825; H04N 21/2743; H04N 21/25833; H04N 21/234363; H04N 21/8166; H04N 21/234336; H04N 21/25858; H04N 21/23439; H04N 21/234381; H04N 21/234335; H04N 21/858; H04N 21/234; H04N 21/2343; H04N 5/45; H04N 21/236
USPC ........................................................ 725/146
See application file for complete search history.

(56) References Cited

U.S. PATENT DOCUMENTS 9,942,591 B2 * 4/2018 Stribling ............ H04N 21/2743
10,271,079 B1 * 4/2019 Woschank ....... H04N 21/25816
(Continued)

*Primary Examiner* — Cynthia M Fogg
(74) *Attorney, Agent, or Firm* — Kilpatrick Townsend & Stockton LLP

(57) ABSTRACT

In one embodiment, a method is disclosed for providing UGC to a media production or broadcast destination for potential inclusion in a broadcast or other media distribution. Video processing parameters of the destination are provided. An application is customized using the parameters to provide a customized application without requiring any additional development for the customization. A token and a link are then transmitted to the destination. The destination accesses the link, and the customized application is downloaded along with an API to the destination. The customized application periodically polls the API for UGC and associated metadata. It then, guided by the parameters, facilitates the ingestion of the media and metadata in the proper format into the appropriate place within the downstream broadcast or media production system.

20 Claims, 20 Drawing Sheets

(56) References Cited

U.S. PATENT DOCUMENTS

| | | | |
|---|---|---|---|
| 2009/0087161 A1* | 4/2009 | Roberts | G11B 27/031 386/282 |
| 2011/0107367 A1* | 5/2011 | Georgis | H04N 21/2347 725/32 |
| 2012/0192225 A1* | 7/2012 | Harwell | H04N 21/2668 725/34 |
| 2012/0320013 A1* | 12/2012 | Perez | H04N 5/91 345/207 |
| 2013/0177294 A1* | 7/2013 | Kennberg | H04N 21/21805 386/241 |
| 2014/0052738 A1* | 2/2014 | Connell-Giammatteo | G11B 27/031 707/748 |
| 2016/0014176 A1* | 1/2016 | Ariav | H04W 4/023 709/219 |
| 2016/0306950 A1* | 10/2016 | Schuman | G06F 21/10 |

* cited by examiner

US 10,743,042 B2

TECHNIQUES FOR INTEGRATION OF MEDIA CONTENT FROM MOBILE DEVICE TO BROADCAST

CROSS-REFERENCES TO RELATED APPLICATIONS

This application is a nonprovisional patent application of Ser. No. 62/471,909 entitled "Techniques for Integration of Media Content from Mobile Device to Broadcast," filed Mar. 15, 2017, the disclosure of which is hereby incorporated in its entirety.

BACKGROUND OF INVENTION

The present disclosure relates generally to processing, acquiring, and providing media content for real-time media broadcast.

Many broadcast systems developed before the Internet use specialized technology. A typical example is producing live telecasts of sporting events. Typically, a game is being played inside of a stadium and outside of that stadium is a mobile unit, a truck, or sometimes more than one truck. The truck has cables running in and out of it from various points in the stadium, typically from high fidelity cameras that are located around the stadium. The cables are often fiber optic cables that are bringing digital video signals from very high fidelity cameras. The data is often in an SDI (Serial Digital Interface) format and is provided to a port of a computer or other device in the truck. Graphics are super-imposed over the video by crews in the trucks.

With the rise of social media, users desire to communicate and share information related to content that they watch. Often times, users may want to share content with others to supplement content they are viewing from a broadcast distribution. Such user content may be referred to as "user-generated content" (UGC) or as user-created content (UCC), representing any form of content including posts, chats, tweets, podcasts, digital images, video, audio files, advertisements and other forms of media. Viewers of broadcasts who wish to participate in communication via social media channels are challenged with ways to share UGC with other users. For many users having a mobile device, the users are able to easily capture content, but are not able to share such content, in real-time, with other users who happen to be viewing the same content via a broadcast transmission. Burst, Inc. of Boston developed techniques for sharing media content—essentially a collaborative platform for creating, viewing, editing and publishing digital content in real time. Broadcast distributors may be challenged with enabling delivery of UGC from users during a broadcast.

It would be desirable to provide ways for content to be shared in real-time with broadcast distribution.

BRIEF SUMMARY OF INVENTION OF THE INVENTION

In one embodiment, techniques are disclosed for providing user generated content (UGC) to a destination for potential inclusion in a broadcast or media production. Video parameters of the destination are provided. An application is customized using the parameters to provide a customized application. A token and a link are then transmitted to the destination. The destination accesses the link, and the customized application is downloaded along with a programming interface, such as an application programming interface (API), to the destination. The customized application periodically polls the interface for UGC. Programming interfaces as disclosed herein may include callable functions to perform operations disclosed as being performed by those interfaces.

In one embodiment, custom parameters (e.g., video format parameters) for media used by the broadcast destination are provided. New UGC is transcoded using the custom parameters. The transcoded new UGC is then downloaded to the broadcast destination. In one embodiment, a scan path to a media destination at the broadcast destination is entered into the customized application. The customized application then directs the downloaded, transcoded new UGC to the media destination indicated by the scan path. In some embodiments, the customized application initiates a request to downstream media systems to transfer the downloaded media and metadata into the broadcast or media production workflow. The request may be a call using a programming interface (e.g., a software development kit) or a socket connection call.

In one embodiment, a URL is designated for an event associated with the broadcast destination. The URL indicates a particular bubble, where a bubble is a virtual collaboration space media and people, brought together for a particular event, topic of interest, or purpose. The URL is published to users for the event. Users then upload UGC to the bubble indicated by the URL.

Some embodiments disclosed herein may be implemented by a computer system that is configured to implement methods and operations disclosed herein. Yet some embodiments relate to systems, computer products, and machine-readable tangible storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, machine-readable tangible storage media, modules, or a combination thereof to perform methods and operations disclosed herein.

DETAILED DESCRIPTION OF THE INVENTION OF THE INVENTION

In the following description, for the purposes of explanation, specific details are set forth in order to provide a thorough understanding of embodiments of the present disclosure. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive. As used herein, the term "broadcast" may encompass both actual broadcasting and media production for a broadcast or any type of media distribution, such as in a media production studio or a newsroom, a truck, or a stadium control room, for example. In addition, "media production" includes media processed for broadcast, as well as other types of media distribution.

I. Architecture of Content Distribution and Communication System

Figure 1:
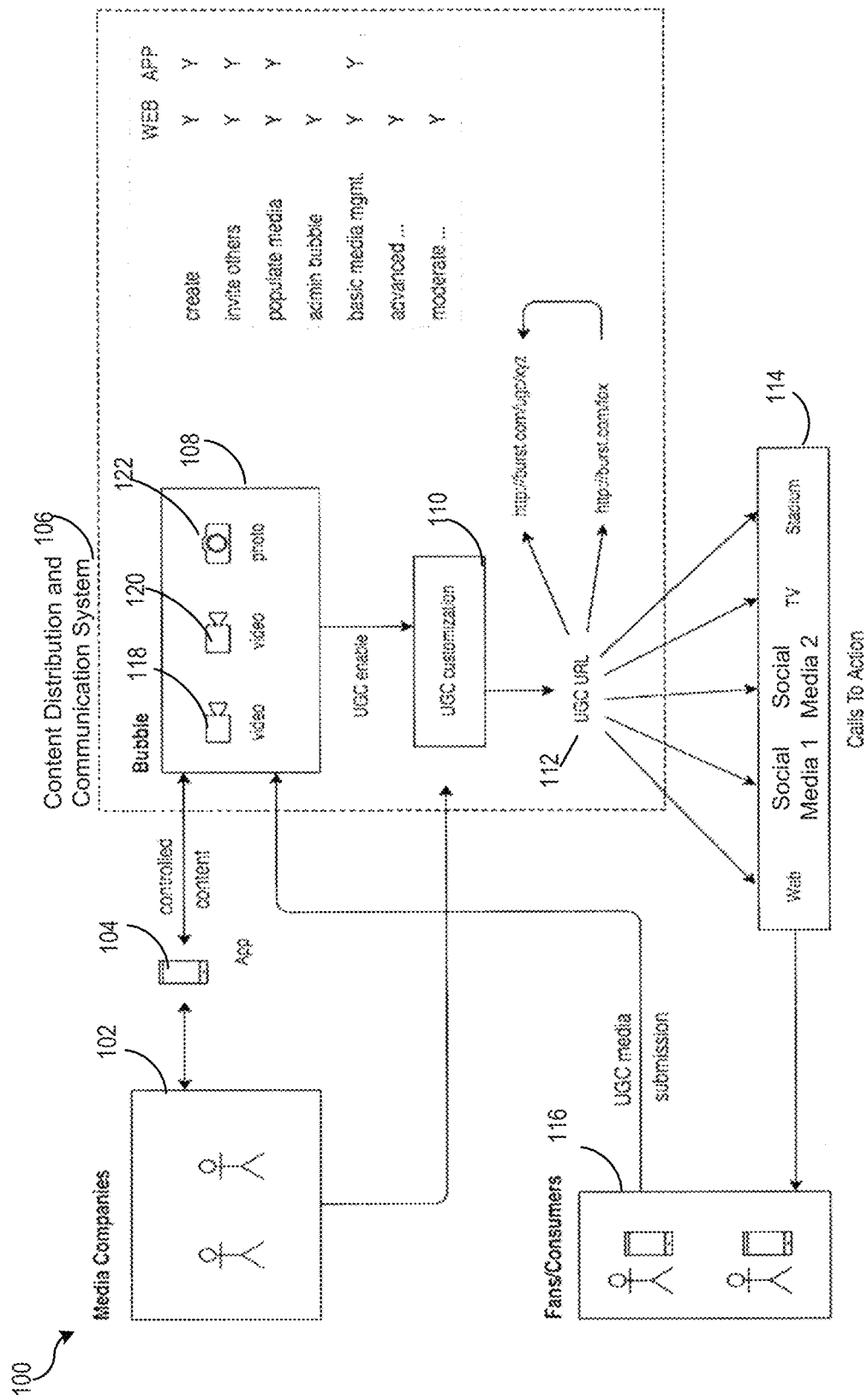
FIG. 1 shows a block diagram of a user generated content submission system according to an embodiment.

FIG. 1 shows a block diagram of a system 100 for enabling a user to provide media content, such as user generated content (UGC), to a broadcast system according to an embodiment of the present disclosure.

Media content (also referred herein as "media") may be represented by data (e.g., also referred to herein as content data) in an electronic form (e.g., electronic media content). Media content may include one or more types of content, including, but not limited to, a file, an image, a video, audio, other electronic media content, or combinations thereof. Content data for media content may be unstructured, structured, or a combination thereof. Media content may be defined based on one or more formats. Media content may be defined as having a format using, without limitation, hypertext markup language (HTML), cascade style sheets (CSS), JavaScript, or other formatting techniques and languages. A format may indicate a style for presenting media content. Media content may be presented in a manner, which the media content can be perceived by a user. In some embodiments, metadata may indicate information (e.g., an attribute) about or associated with media content. Some media content may be generated or created by a user (e.g., a consumer). Such media content may be referred to as "user generated content" (UGC) or "user created content" (UCC).

A broadcast system 102 may broadcast media content to users. The broadcast system may be managed by one or more media companies or other entity. A broadcast system may be implemented by one or more computer systems. Broadcast system 102 may provide a destination where content can be provided for incorporation into a broadcast by broadcast system 102.

A broadcast system may be implemented using a computer system, which may comprise one or more computers and/or servers which may be general purpose computers, specialized server computers (including, by way of example, Windows servers, UNIX or Linux servers, mid-range servers, mainframe computers, rack-mounted servers, etc.), server farms, server clusters, distributed servers, or any other appropriate arrangement and/or combination thereof. The computing system that makes up content system 106 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like. In one example, content system 106 may be included in or implemented in a product (e.g., BurstOnTV) provided by Burst, Inc. In various embodiments, content system 106 may be configured to run one or more services or software applications described in the foregoing disclosure. For example, content system 106 may correspond to a computing system for performing processing as described herein according to an embodiment of the present disclosure.

Content system 106 may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing system that makes up content system 106 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like. In one example, content system 106 may be included in or implemented in a product (e.g., BurstOnTV) provided by Burst, Inc. In various embodiments, content system 106 may be configured to run one or more services or software applications described in the foregoing disclosure. For example, content system 106 may correspond to a computing system for performing processing as described herein according to an embodiment of the present disclosure.

Broadcast system 102 may communicate with one or more clients systems 104 (referred to herein as "client system" or "client"). Broadcast system 102 may communicate with a content distribution and communication system 106 (also referred to herein as a "content system"). Broadcast system may communicate with media system through one or more client systems. Client systems may include devices 116 operated by users (e.g., fans and/or consumers). Consumers may generate UGC for submission to content system 106. A client system may be a device or an application (also referred to herein as an "app") operating on a device. Client system 104 may be a user-operated computing device that may be implemented using hardware, firmware, software, or combinations thereof to interact with content system 106. For example, client system 104 may be a client device, including, without limitation, a desktop computer, a laptop computer, a tablet computer, a smart phone, a wearable computing device, a personal digital assistant, and so on. Client system 104 may be a device implemented as an iPhone provided by Apple Corporation, an Android-based device, or other mobile communication device.

An application may be stored and executed locally on a client system. In some embodiments, all or part of an application may be hosted and executed remotely on a computing system, e.g., content system 106, accessible to a client system. An application may be implemented as a client app executing on an operating system of a client system, a web browser that interfaces with a web based messaging service, a service-specific application provided by content system 106, or another app. For example, an application may be implemented by content system 106 and accessed from a client system, a broadcast system or combinations thereof. In some embodiments, an application may be provided as a service by content system 106.

Content system 106 may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing system that makes up content system 106 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like. In one example, content system 106 may be included in or implemented in a product (e.g., BurstOnTV) provided by Burst, Inc. In various embodiments, content system 106 may be configured to run one or more services or software applications described in the foregoing disclosure. For example, content system 106 may correspond to a computing system for performing processing as described herein according to an embodiment of the present disclosure.

In some embodiments, content system 106 may be implemented as an enterprise computing system or a cloud computing system comprising one or more computers and/or servers that may include those described above. Content system 106 may include several subsystems and/or modules, including some, which may not be shown. Content system 106 may have more or fewer subsystems and/or modules than shown in the figure, may combine two or more subsystems and/or modules, or may have a different configuration or arrangement of subsystems and/or modules. Subsystems and modules of content system 106 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

In certain embodiments, content system 106 may also provide other services or software applications can include non-virtual and virtual environments. For example, content system 106 may be implemented as a cloud-based system which operates as a cloud by communicating with client systems and broadcast systems using one or more communication networks (e.g., the Internet). In some embodiments, these services may be offered as web based or cloud services or under Software as a Service (SaaS) model to the users of broadcast systems and client systems. The services and/or applications may be provided via a communication network, such as the Internet. The services offered by content system 106 may include application services. Content system 106 may be accessed using one or more applications to utilize the services or applications provided by content system 106. Application services may be provided by content system 106 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in content system 106, which may be implemented as a cloud infrastructure system. Users can acquire the application services without the need for customers to purchase separate licenses and support. Various different SaaS services may be provided.

Users operating client system 104 may in turn utilize one or more applications to interact with content system 106 to utilize the services provided by subsystems and/or modules of content system 106. Services may be offered as a self-service or a subscription. In some embodiments, a specific instantiation of a service provided by content system 106 may be referred to herein as a "service." A service made available to a user via network (e.g., a communication network) from content system 106 is referred to as a "cloud service." In some embodiments, content system 106 may host an application, and a user may, via a network, access the application at on demand. For example, a user operating a client system 104 may facilitate communication between broadcast system 102 and content system 106.

Content system 106 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in content system 106 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

Communication between elements in system 100 may be facilitated using one or more communication networks of various types. Examples of communication networks include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols. In some embodiments, communication may be facilitated using one or more messaging services. Examples of messaging services may include email services such as Gmail™ (a service of Google Inc.) and Yahoo!® Mail (a service of Yahoo! Inc.). Other examples may include instant messaging or chat services such as Gmail's chat feature or Facebook's chat (a service of Facebook, Inc.), a short message service (SMS) and/or a multimedia messaging service (MMS) provided by cellular data carriers, social network services with a messaging component (e.g., social networks provided by Facebook, Inc., or LinkedIn Corp.).

A "message" may include any electronic communication generated by a sender and directed to one or more recipients, such as email messages, instant messages (e.g., messages sent between users using various "chat" services), SMS/MMS messages (e.g., messages conforming to SMS and/or MMS protocols supported by various cellular and other wireless data networks), voice messages, photo/image messages, social network messages, and so on. In some embodiments, communication may be facilitated using a push notification system implemented by a push notification service (e.g., Apple push notification service provided by the Apple® corporation or Google notification service provided by the Google® corporation).

Content system 106 may provide an interface (e.g., a graphical interface) to access features of content system 106. The interface may be provided as an application or a service. An interface may enable a user to create one or more data storage structures, such as a data storage container 108 (also referred to herein as a "bubble"), to store media content, such as UGC. The bubble 108 may be implemented using software, hardware, firmware, or combinations thereof for receiving and storing media. A bubble may be implemented using one or more data stores.

Any of the data stores (or data storage systems) disclosed herein may be implemented using any type of persistent storage device, such as a memory storage device or other non-transitory computer-readable storage media. In some embodiments, local storage may include or implement one or more databases (e.g., a document database, a relational database, or other type of database), one or more file stores, one or more file systems, or combinations thereof. Memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

The content in a bubble may be associated with a broadcast of media content. A bubble may be created by media companies and fans/consumers. A bubble may be created to store UGC having one or more attributes, such as a particular event, a theme, a location, a time, a broadcast, etc. A bubble may be created for access through a web based interface and/or an application. A user (e.g., an administrator of content) may manage content in a bubble. One or more management attributes may be configured for a bubble. For example, management attributes may include, without limitation, creating, reading, updating, deleting, inviting others, populating media, administration, media management, advanced functions, moderate functions, or other media use and management functions.

Upon creation of a bubble 108 and enabling reception of UGC, a bubble can be customized by content system 106. Content system 106 may include a customization module 110 which can configure and/or customize a bubble. Customization module 110 may generates a unique address or location, such as a uniform resource locator (URL) 112. A URL can be randomly generated, or can be a vanity URL with the name of the sponsor, for example. The URL can then be advertised to fans/consumers via various media channels 114, such as on a web page, social media channels (e.g., Facebook®, or Twitter®), TV or a Stadium big screen.

Users (e.g., fans, consumers, and/or viewers) can operate their devices 116 to obtain media content (e.g., videos, photos, audio recordings, graphics and other media) and upload the media content to bubble 108 using the URL 112. Bubble 108 can store media content, such as multiple videos 118, 120 and photos 122 along with other media. Multiple bubbles can be used. These uploads are optimized for the connectivity conditions and the quality levels of the media to ensure successful uploads with the least detriment to media quality.

Figure 2:
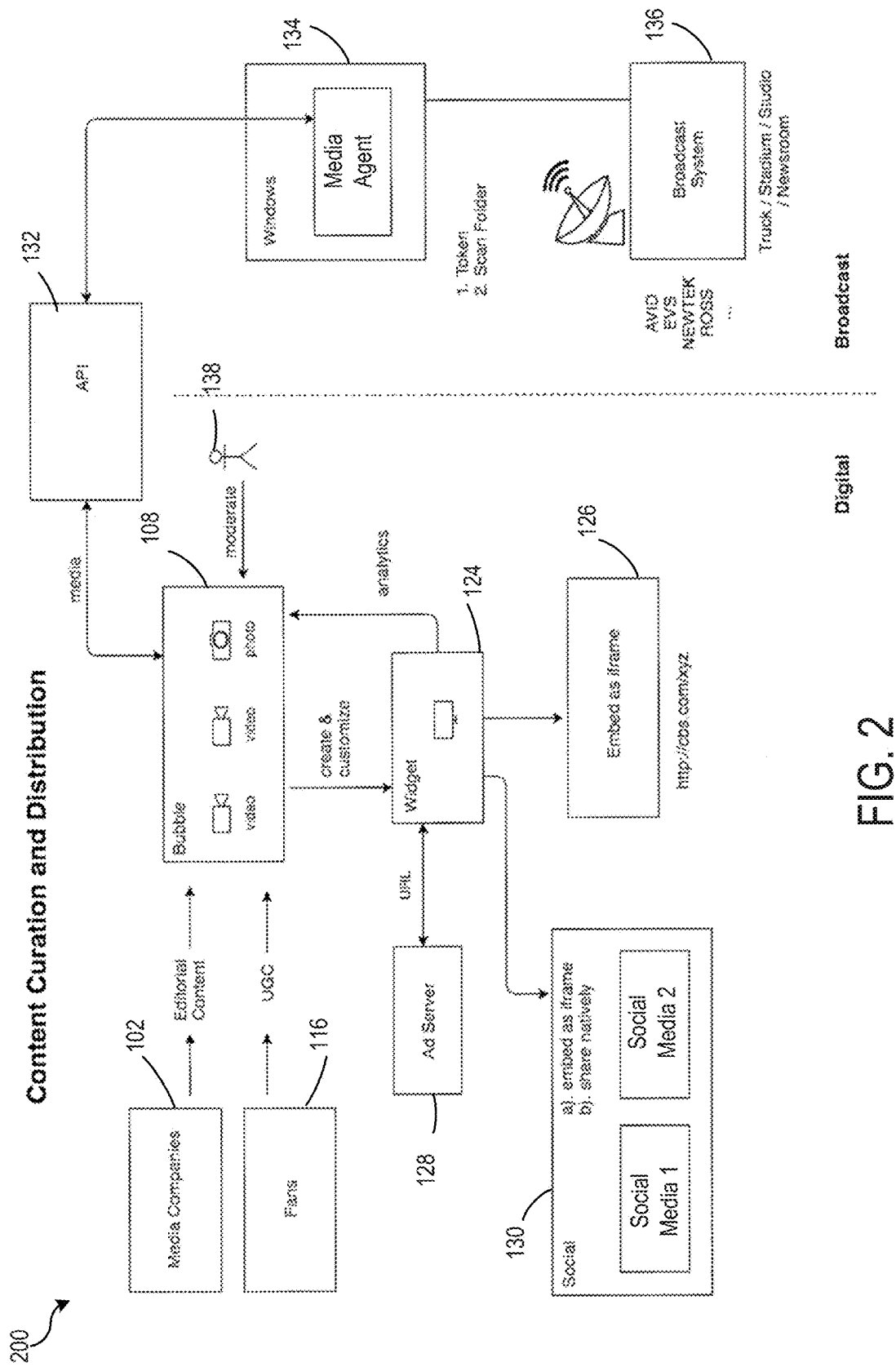
FIG. 2 is a block diagram illustrating content curation and distribution according to an embodiment.

FIG. 2 is a block diagram illustrating a system 200 for content curation and distribution according to an embodiment. System 200 may be implemented using all or some of elements of FIG. 1, such as content system 106. Both UGC from devices 116 of fans and editorial content from broadcast systems 102 of media companies can be provided to one or more bubbles (e.g., bubble 108) at content system 106. The media content in bubble 108 can then be approved and curated by one or more mediators 138. Derivative or modified media can be created and customized using an application (e.g., a widget 124) accessible through content system 106. The widget can provide the derivative media to a variety of media destinations, such as media distribution channels using an iframe 126) for embedding in a website or a native app, an ad server 128 for providing to other websites and distribution channels, and social media sites 130, such as Facebook® or Twitter®. Alternately, the media content can be provided through a programming interface (e.g., an API 132) to a Windows, Mac OS X, Linux or other platform 134 for use by a broadcast system 136 (e.g., broadcast system 102). Platform 134 may be implemented by an entity that is different from a company associated with broadcast system 136. For example, the entity may be a production company that provides services to a broadcast system. Platform 134 may be implemented using one or more computer systems, such as any of those described for a broadcast system. Platform 134 may be implemented with programming code (e.g., an application), such as a media agent, configured for communication with content system 106 and broadcast system 136.

The broadcast system 136 may be a truck, a stadium control room, a media production studio or a newsroom, for example. The API 132 provides the media content to a broadcast format customized for the particular broadcast system 136. The media content may be converted from a digital format (e.g., an Internet-based format) to the broadcast format.

Figure 3:
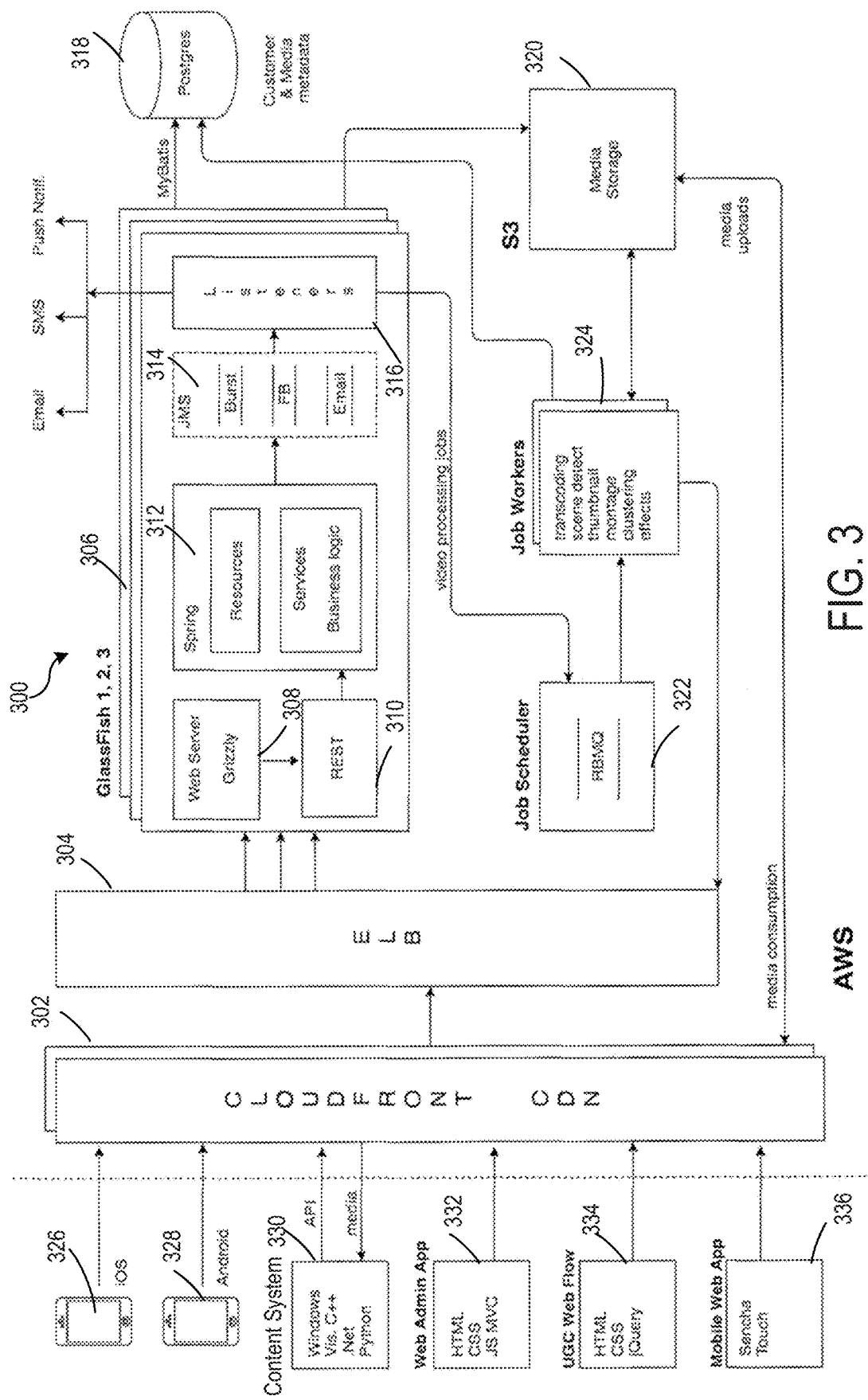
FIG. 3 is a block diagram illustrating a bubble and widget architecture according to an embodiment.

FIG. 3 is a block diagram illustrating a system 300 including a bubble and widget architecture according to an embodiment. System 300 may be implemented in or with system 100. Bubble 108 and widget 124 of FIG. 2 may be implemented as shown in FIG. 3. A programming interface, such as interface 302 may be implemented using one or more computer systems, such as an edge service. Interface 302 may be implemented as a cloud-based CDN (Content Delivery Network) to receive and send data. An example of a CDN may be a Cloudfront CDN provided by Amazon Web Services. Interface 302 may be implemented as part of content system 106.

System 300 may include one or more load balancers, such as an ELB (Elastic Load Balancer) 304. ELB 304 can route API calls to a cluster of server systems 306, such as one or more server computers implemented using GlassFish open source. ELB 304 may be implemented in content system 106. System 300 may include a web server 308, such as a Grizzly server, provides web based services (e.g., HTTP services) and multiple thread management. Server 308 uses a REST (Representational State Transfer) service 310—an architectural style for networked hypermedia applications used to build Web services that are lightweight, maintainable, and scalable.

System 300 may include an interface 312, such as a Spring interface, provides a common interface for diverse resources, such as transaction management, authentication and session control. Interface 312 communicates with a Java Message Service (JMS) 314, which can enable asynchronous processing for various actions such as sending messages through email, SMS and push notifications. An event listener 316 detects events, and can push them out and store them in a database 318, such as an open source Postgres database or deliver them to other external systems. The database 318 also stores all meta data, consumer information and all the data necessary to process, curate and distribute the media.

A media storage database 320 can store the media received through various bubbles. A job scheduler 322 schedules jobs for job workers 324, which handle various processing functions such as transcoding, scene detection, thumbnail detection, montage creation, clustering and applying effects to media.

Each of the elements 302-324 can be implemented in or with content system 106.

Interface 302 can be an edge server that interfaces with various input and output applications, such as user mobile devices 326 and 328, a content system 330 (e.g., a system for BurstOnTV provided by Burst, Inc.), a web administrator application 332, a UGC (User Generated Content) web flow application 334 and a mobile web application 336.

Figure 4:
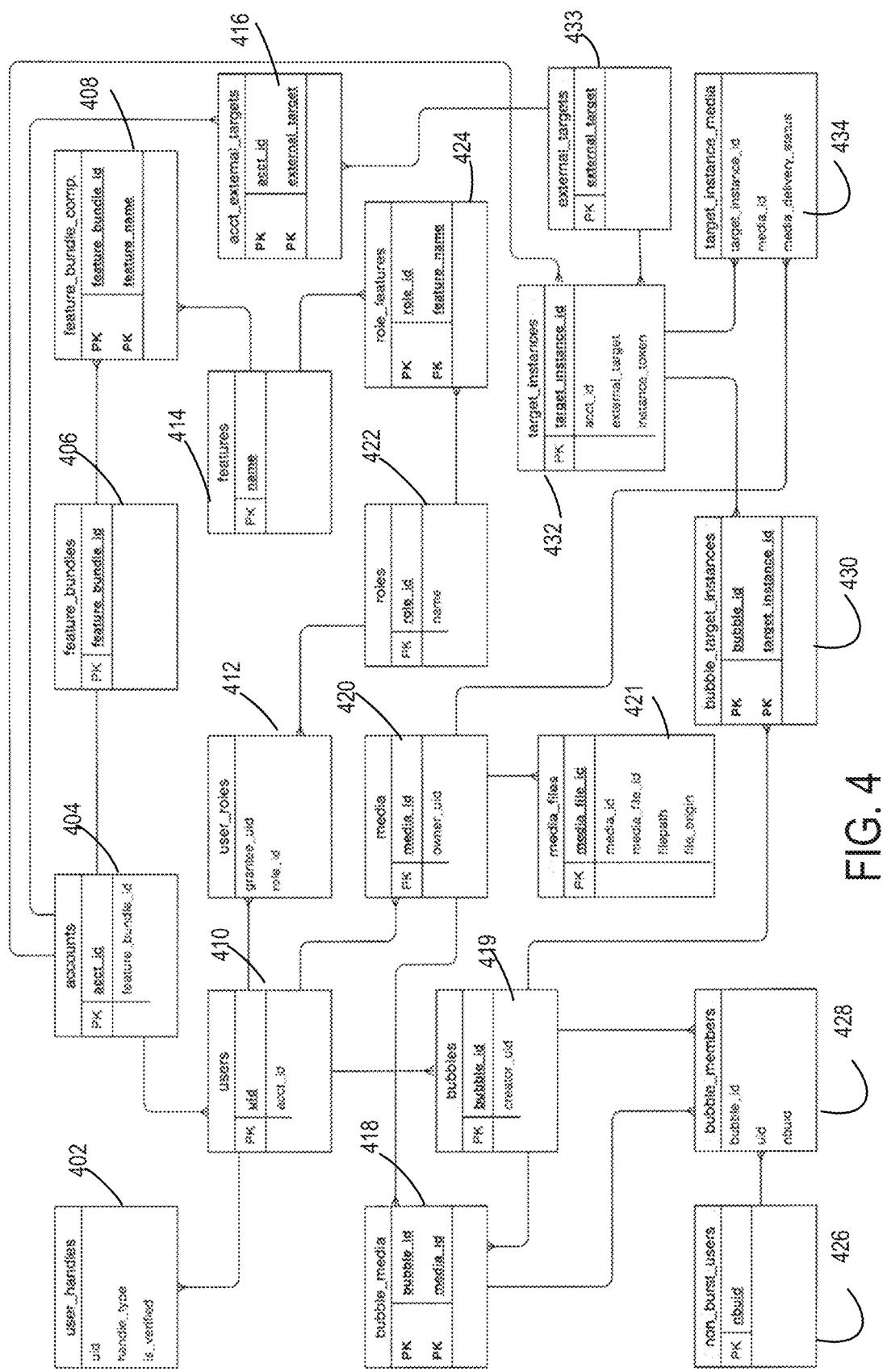
FIG. 4 is a diagram of a subset of data structures implemented in an embodiment.

FIG. 4 is a diagram of a subset of data structures as implemented in an embodiment. The total set of tables can be hundreds of tables or more. User_handles 402 identify particular users, with each user having a user ID 410 and user_roles 412 selected from roles 422 which have role_features 424. Accounts 404 identify particular customer accounts. Feature_bundles 406 provide combinations of features 414 as specified in feature_bundle_components 408. Bubble_media 418 identifies which media 420 are in which bubbles. Media_files 421 tracks each media file associated with each item of media content, such as thumbnail files of various sizes, and video files of different quality levels and resolutions generated via transcoding from a single original user submitted media file. Bubbles 419 can be associated with bubble members 428, to indicate who are direct invitees to a bubble, which can include non-registered-users 426 or registered users 410.

External_targets 433 are the broadcast and production systems to which media can be delivered. Target_instances 432 are the individual instances of such external targets. Thus, each target instance is a truck or a studio or a stadium control room running the broadcast system specified by the associated external_target. Bubble_target_instances 430 relate one or more bubbles to one or more target instances. There is a one-to-many relationship in both directions. Thus, one bubble can feed many trucks and many studios, and one truck or studio can be fed by many different bubbles. Acct_external_target 416 indicates which external systems each account in accounts 404 is provisioned for. For example, an account may be provisioned for EVS, and certain target instances also known as destinations (trucks or studios) of an account may be provisioned for EVS. Target_instance_media 434 keeps track of every destination to which media has been sent, and what is the status assigned to the media, such as downloaded, ingested, failed, etc. External targets of accounts 416 are selected from external_targets 433. Target_instances 432 link to target_instance_media 434 and bubble_target_instances 430.

Each piece of media content can have many files associated with the original file the user sends. Those files include all of the transcoded variations of the files including thumbnails of various different shapes and the different quality streams and formats for the media. The media files themselves are stored, in one embodiment, on a storage service such as Amazon S3. The database tables reference the actual media locations on Amazon S3. The customer and media metadata are stored in the tables rather than in Amazon S3 in one embodiment.

II. Interfaces for Content Distribution and Communication System

FIGS. 5-13 and 17 illustrate interfaces according to some embodiments. Each of the interfaces may be displayed at a device or a computer system. For example, an interface may be presented at a client system, a broadcast system, or combinations thereof. Interfaces may include an interface, such as a physical interface, a graphical interface (e.g., a graphical user interface), or a combination thereof. A graphical interface may be generated by a device and/or received from content system 106, or a combination thereof. An interface may be updated, modified, enhanced, and regenerated, without restriction, in response to one or more events (e.g., an interaction with the graphical interface). Examples of graphical interfaces are disclosed herein with reference to the figures. The graphical interface(s) enable functionality disclosed herein, such as functionality of content system 106. A graphical interface may be provided by content system 106 via a network as part of a service (e.g., a cloud service or a web based service) or application. In some embodiments, a device may provide access to one or more applications. An application may enable a user to access and perform services provided by content system 106.

Figure 5:
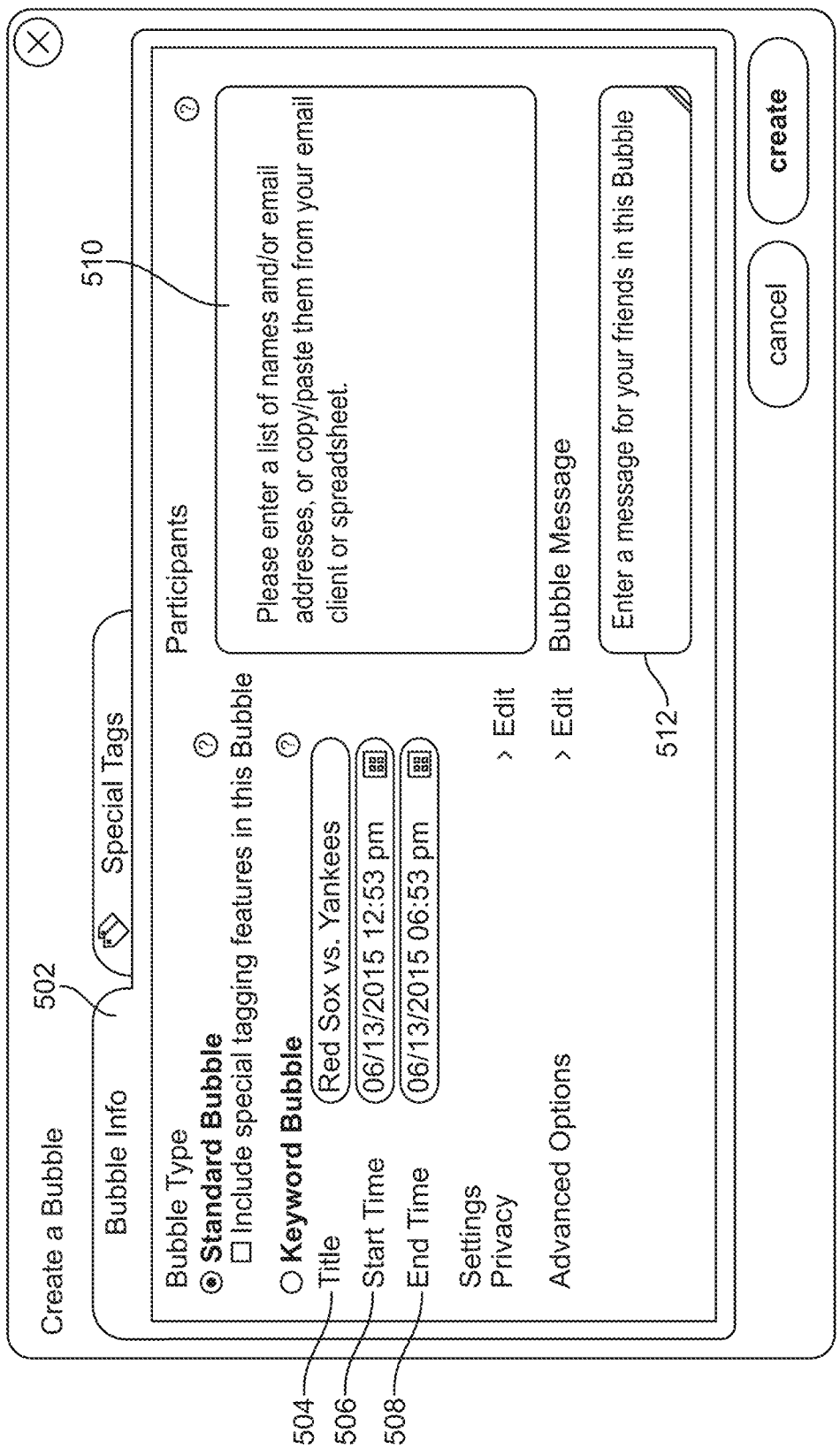
FIG. 5 is a diagram of a graphical user interface for an individual to create a bubble according to an embodiment.

In this disclosure, "an element" may be included in an interface. An element may be displayable and/or part of an interface. Examples of elements include, without limitation, a control, a button, a navigation bar, or other visible component that can be part of an interface that can be perceived by sound, vision, touch, or combinations thereof. An element can receive input. For example, an interactive element may be an element that is interactive to receive input. An interactive element may receive input to enable interaction with the graphical interface FIG. 5 is a diagram of a graphical user interface for an individual to create a bubble according to an embodiment. A bubble info tab 502 provides various fields for defining attributes of the bubble. A bubble title 504 is provided, along with a start time 506 and an end time 508. A participant's field 510 allows the entry of names, phone numbers and/or email addresses of those who will be invited to submit media to the bubble. A bubble message field 512 provides a message to participants.

Figure 6:
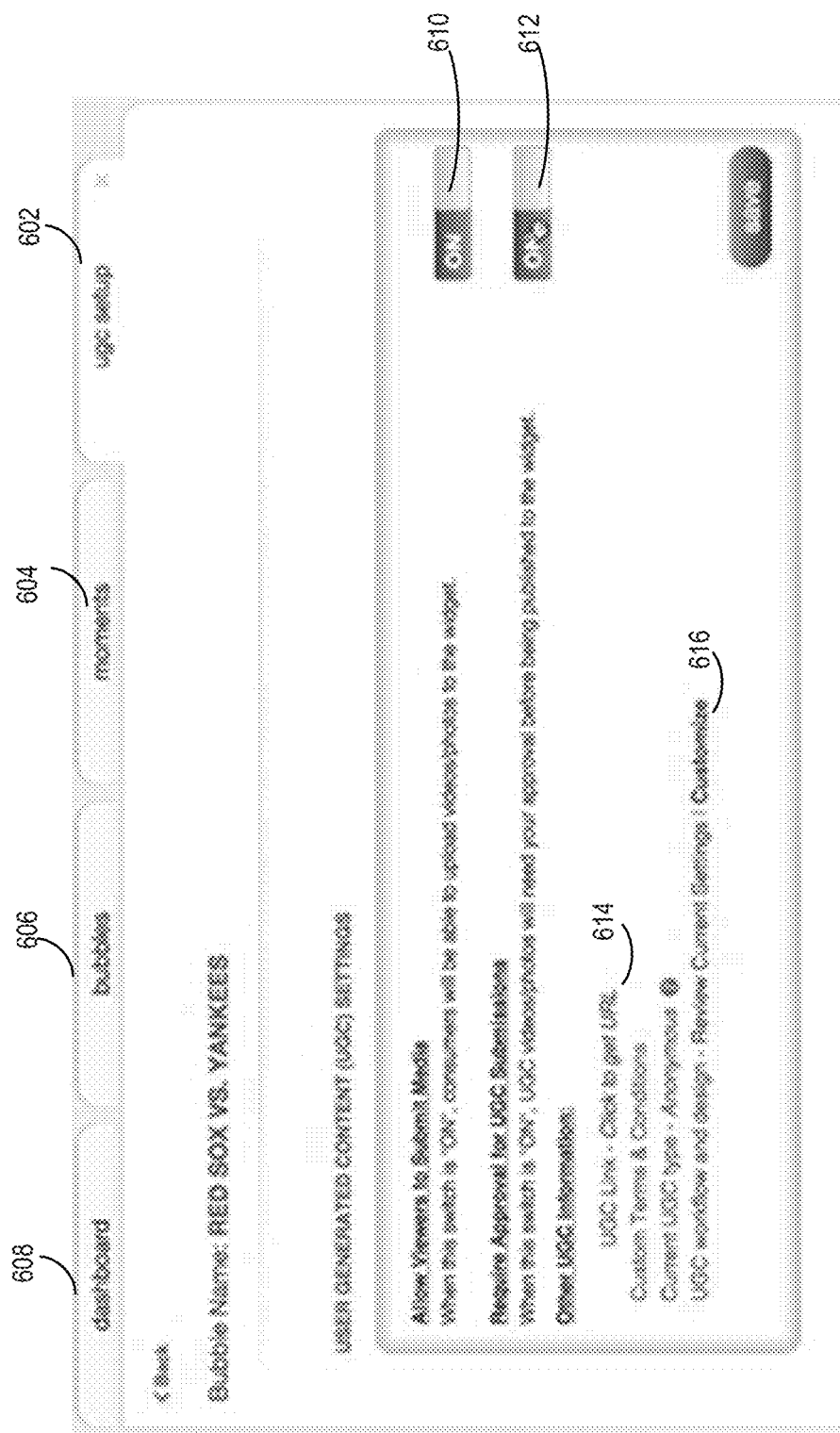
FIG. 6 is a diagram of a graphical user interface for UGC settings for a bubble according to an embodiment.

FIG. 6 is a diagram of a graphical user interface for UGC settings for a bubble according to an embodiment. A UGC setup tab 602 is shown. Other tabs are provided as well, including a moments tab 604, a bubbles tab 606 and a dashboard tab 608. Moments tab 604 allows managing of media. Bubbles tab 606 provides for managing multiple bubbles, and selecting a particular bubble. Dashboard tab 608 provides for tracking views, media, bubbles and adding new media and bubbles. Shown on tab 602 is a particular selected bubble. A switch 610 allows setting the bubble to "ON" which allows viewers to submit media. A button 612 can be used to require approval before any UGC is published to a widget (e.g., widget 124 of FIG. 2). For a media company, particular editors can be given approval control via an administrative setting. A line 614 can be clicked to obtain a URL for the bubble. A link 616 (a URL) allows customization of the UGC workflow and design.

Figure 7:
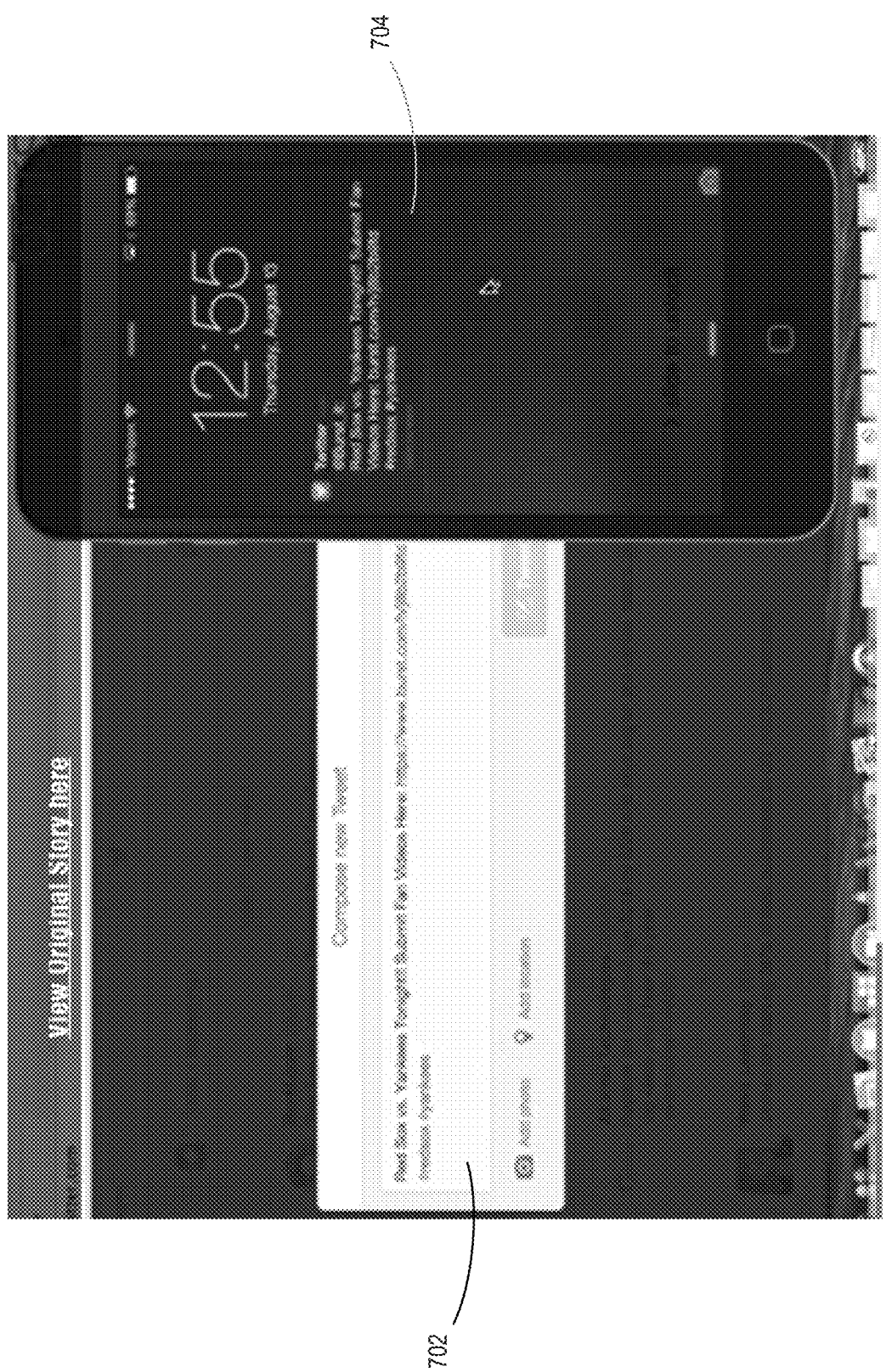
FIG. 7 is a diagram of a graphical user interface for announcing a bubble on Twitter, and receiving the announcement, according to an embodiment.

FIG. 7 is a diagram of a graphical user interface for sharing media content from a bubble on Twitter®, according to an embodiment. A window 702 is shown for composing a new tweet. The tweet can include the URL to use for media submissions. An interface to Twitter® is provided as shown as part of the social interface 130 of FIG. 2. The tweet 704 is shown as it appears on a user device. As described above, other media can be similarly used, such as Facebook®, email mailing lists, etc.

Figure 8B:
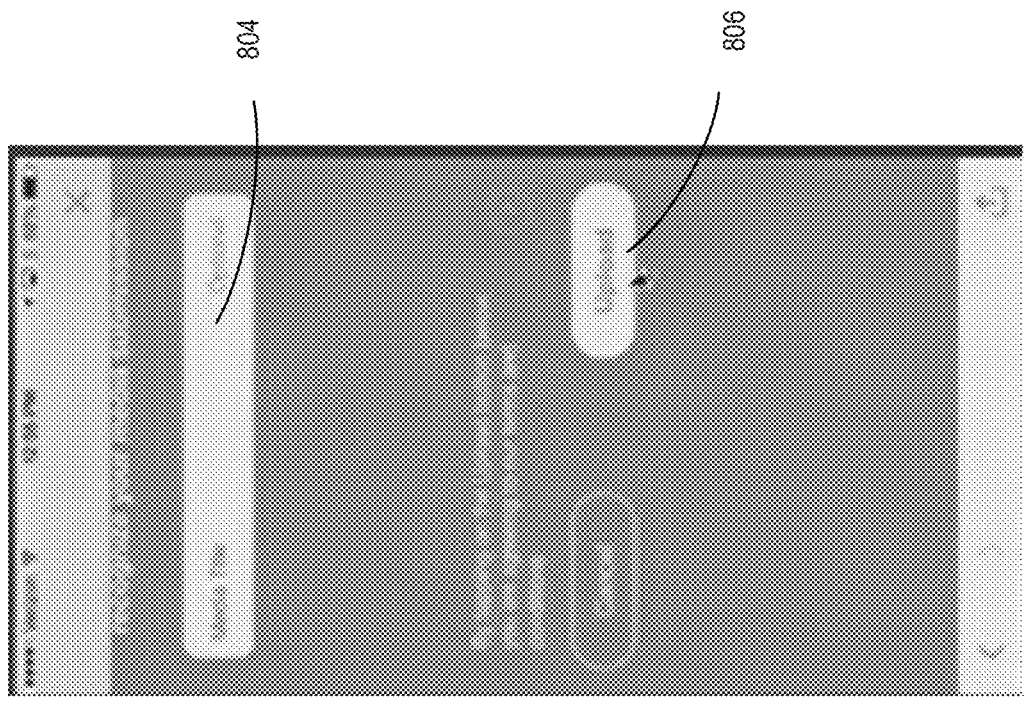
FIGS. 8A-B are diagrams of a graphical user interface for submitting media to a bubble according to an embodiment.
Figure 8A:
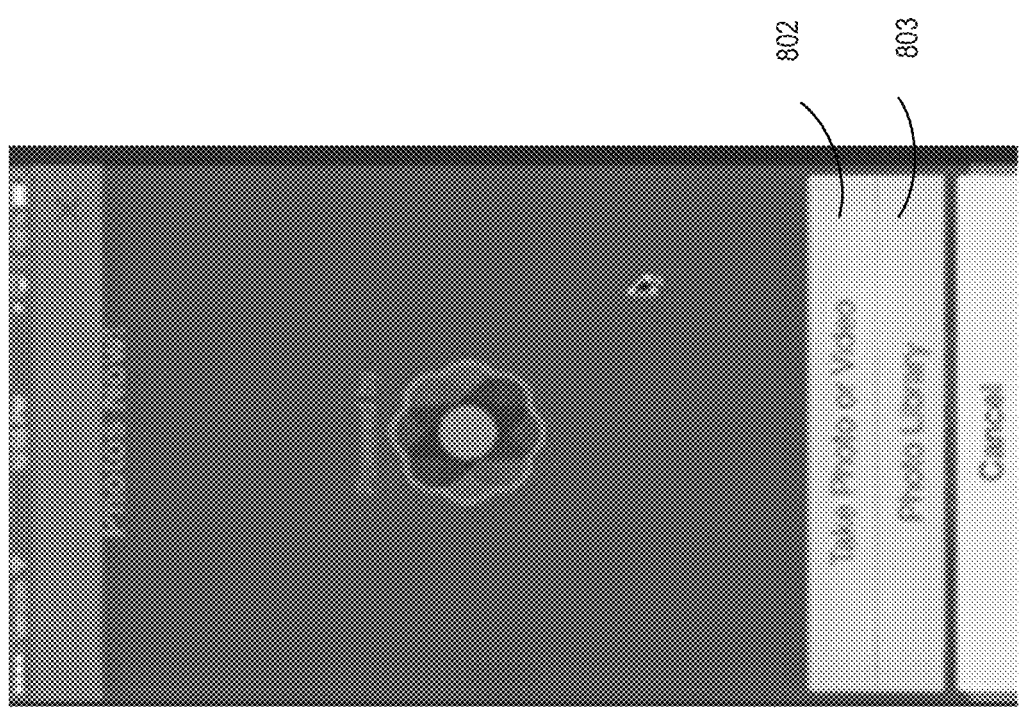

FIGS. 8A-B are diagrams of a graphical user interface for submitting media to a bubble according to an embodiment. As shown in FIG. 8A, the user can go to the URL provided, for example, as shown in FIG. 7. Instead of downloading an app to the user, the URL provides a website which does all the prompting and processing needed to help the user to upload media. The user is then prompted with a button 802 to take a photo or video, or with a button 803 to select a photo or video already taken. As shown in FIG. 8B, The user can optionally provide a name for the media in field 804, and then can upload the media using button 806. Although photos and videos are shown in this example, other media can be uploaded, such as audio recordings, graphics, or other documents.

Figure 9:
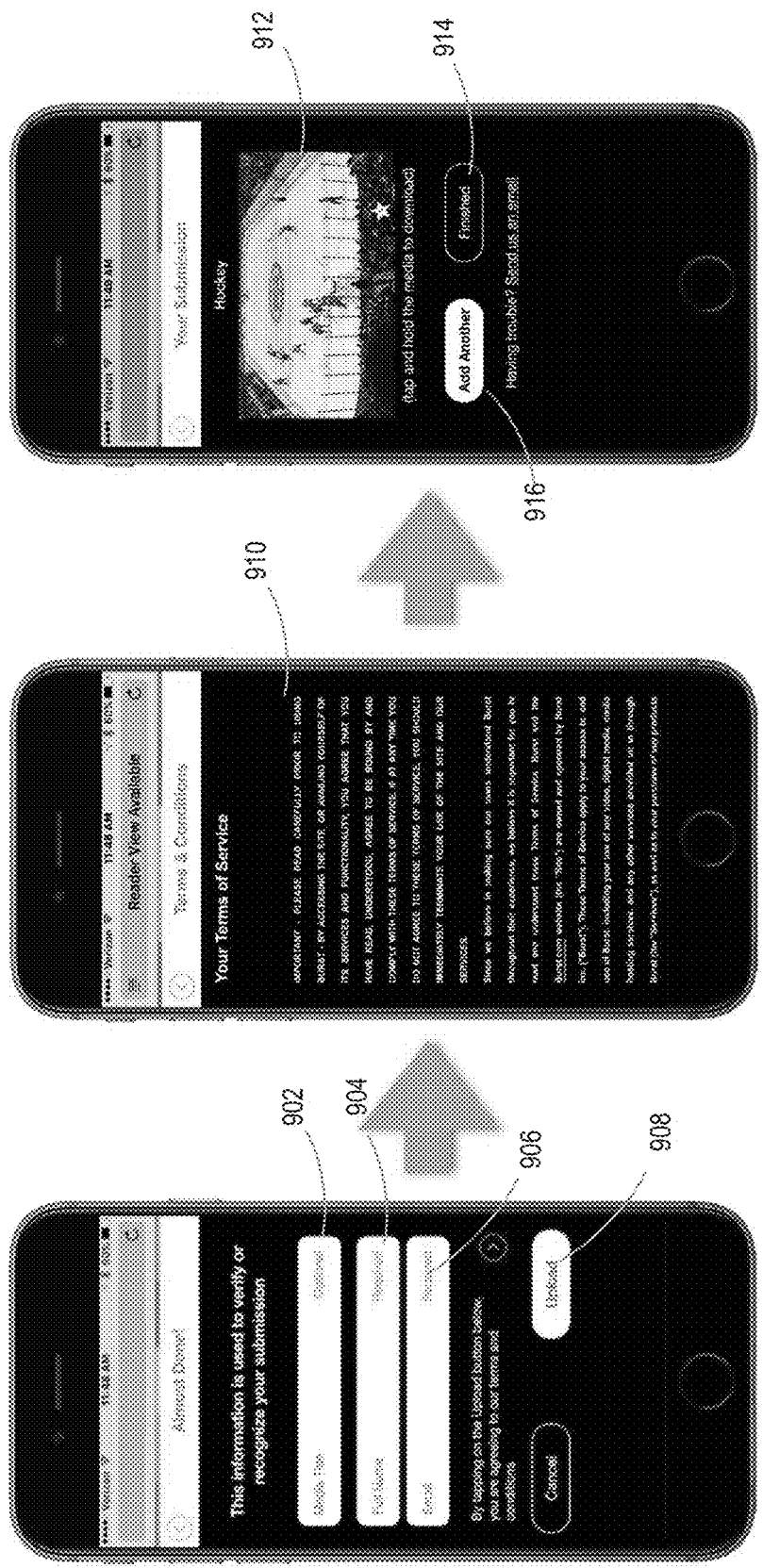
FIG. 9 is a diagram of additional elements of a graphical user interface for submitting media to a bubble according to an embodiment.

FIG. 9 is a diagram of additional elements of a graphical user interface for submitting media to a bubble according to an embodiment. A new user is prompted to enter a media title in field 902, the user's name in field 904 and the user's email address in field 906. The user's name and email are used to register, and can automatically be provided for subsequent uploads from the same device.

An upload button 908 initiates the upload. The upload is optimized for the available bandwidth on the device at that moment. The media is chunked into small chunks as specified by a server-side customizable parameter for access from content system 106. Multiple parallel connections to the content system 106 are initiated. The progress of uploading each chunk is monitored. Periodically, additional parallel connections are initiated if the bandwidth is available to support that. If the uploads begin to slow down, parallelization is reduced. Failed chunk uploads are retried automatically. In one embodiment, the connections to content system 106 are made to an edge server within the CloudFront CDN, which is specifically customized and utilized to handle uploads. By clicking the upload button 908, the user is agreeing to the terms and conditions, as shown in screen 910. This provides the consent of the user for use of the uploaded media. The media as uploaded is then shown in screen 912 for user verification by clicking a "Finished" button 914. Alternately, the user may click "add another" button 916 to initiate another upload, and return to the photo/media selection screen of FIG. 8A. The customer can decide through the UGC setup tab 602 whether they want the terms and conditions presented in a manner that requires reading them first, or not.

Figure 10:
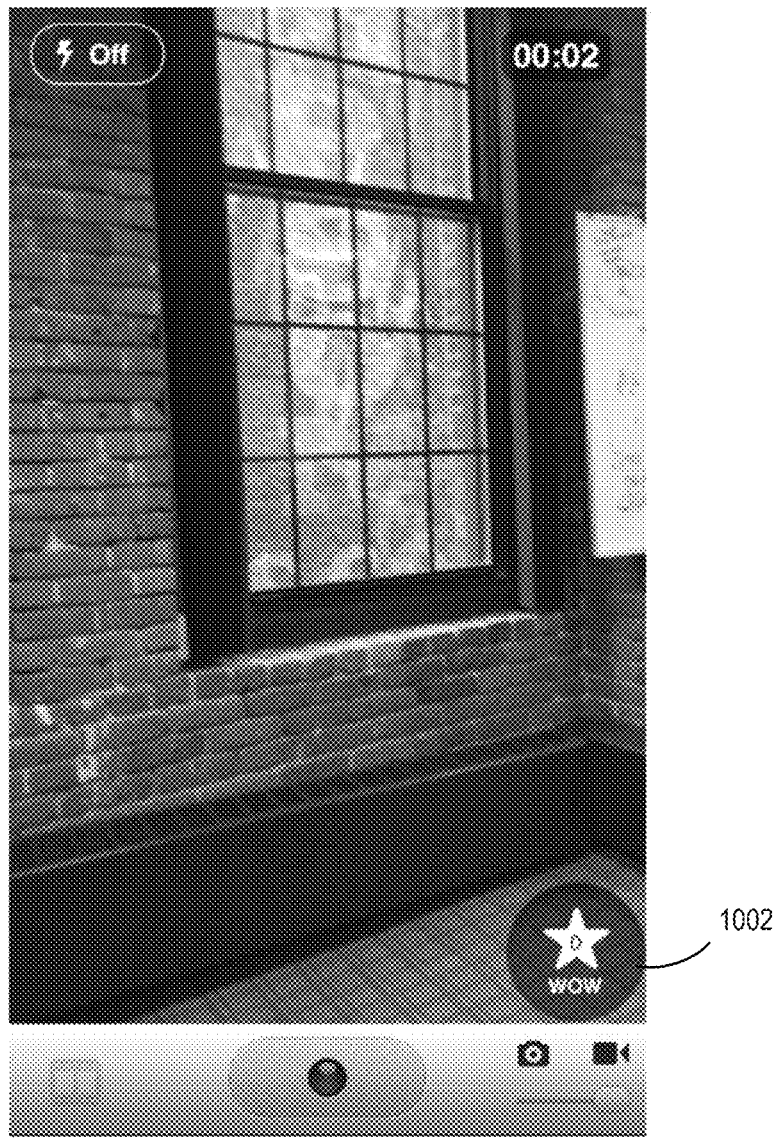
FIG. 10 is a diagram illustrating the addition of a WOW tag to UGC media according to an embodiment.

FIG. 10 is a diagram illustrating the addition of a WOW marker to UGC media according to an embodiment. A WOW button 1002 is shown that can be used to indicate particularly good photos or videos or other media, or particularly good portions. In one embodiment, the WOW button can pop-up on a video for the user to click to indicate the start of the good portion, and the user can click again at the end of the good portion. In alternate embodiments, the WOW button can be pulled up from a menu, caused to appear with a particular keystroke or combination of keystrokes or gestures, or can be provided in other ways. The WOW marker could be initiated by the user verbally saying "WOW" in another example. The WOW marker is added to the meta data for the media, along with a time stamp for the start and stop times of the WOW marker, if applicable. If particular start and stop times are not indicated, the WOW marker applies to the whole video or other media.

Figure 11:
FIG. 11 is a diagram illustrating multiple bubbles according to an embodiment.

FIG. 11 is a diagram illustrating multiple bubbles according to an embodiment. Two bubbles 1102 and 1104 are illustrated, each being displayed with a thumbnail of the videos/photos in the bubble. The user can select to see all bubbles, the user's own bubbles, or can search for bubbles by keyword. The user can click the "Manage Bubbles" button 1106 to manage a group of bubbles or a particular bubble.

Figure 12:
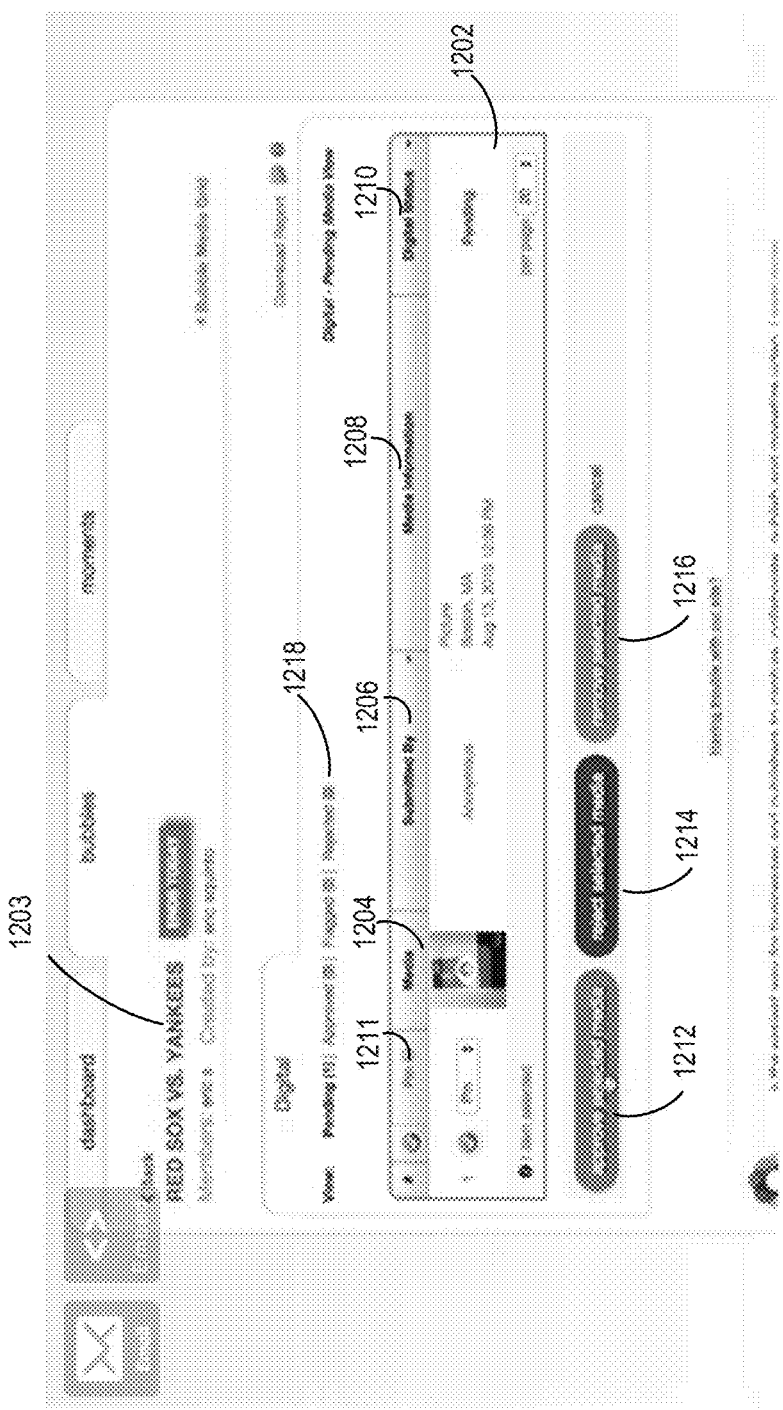
FIG. 12 is a diagram illustrating the management of media in a bubble according to an embodiment.

FIG. 12 is a diagram illustrating the management of media in a bubble according to an embodiment. A window 1202 identifies a particular media with a title 1203, a thumbnail 1204 and metadata. The metadata includes the name of the submitter 1206, or anonymous, and media information 1208 including the type of media, the location where the media was recorded, and the time when the media was recorded. The status 1210 is also indicated ("pending" status in this example). The window 1202 is managed by an editor with editing or approval rights. The editor can click the thumbnail to view the media. The editor can further decide to position the media at particular position within the bubble, or "pin" it by using a pin field 1211. The editor can then select key 1212 to approve the selected media for publishing, reject the media with button 1214 or remove the media with button 1216. The editor can use menu 1218 to switch between different groupings of media to view, such as pending, approved, flagged and rejected.

Figure 13A:
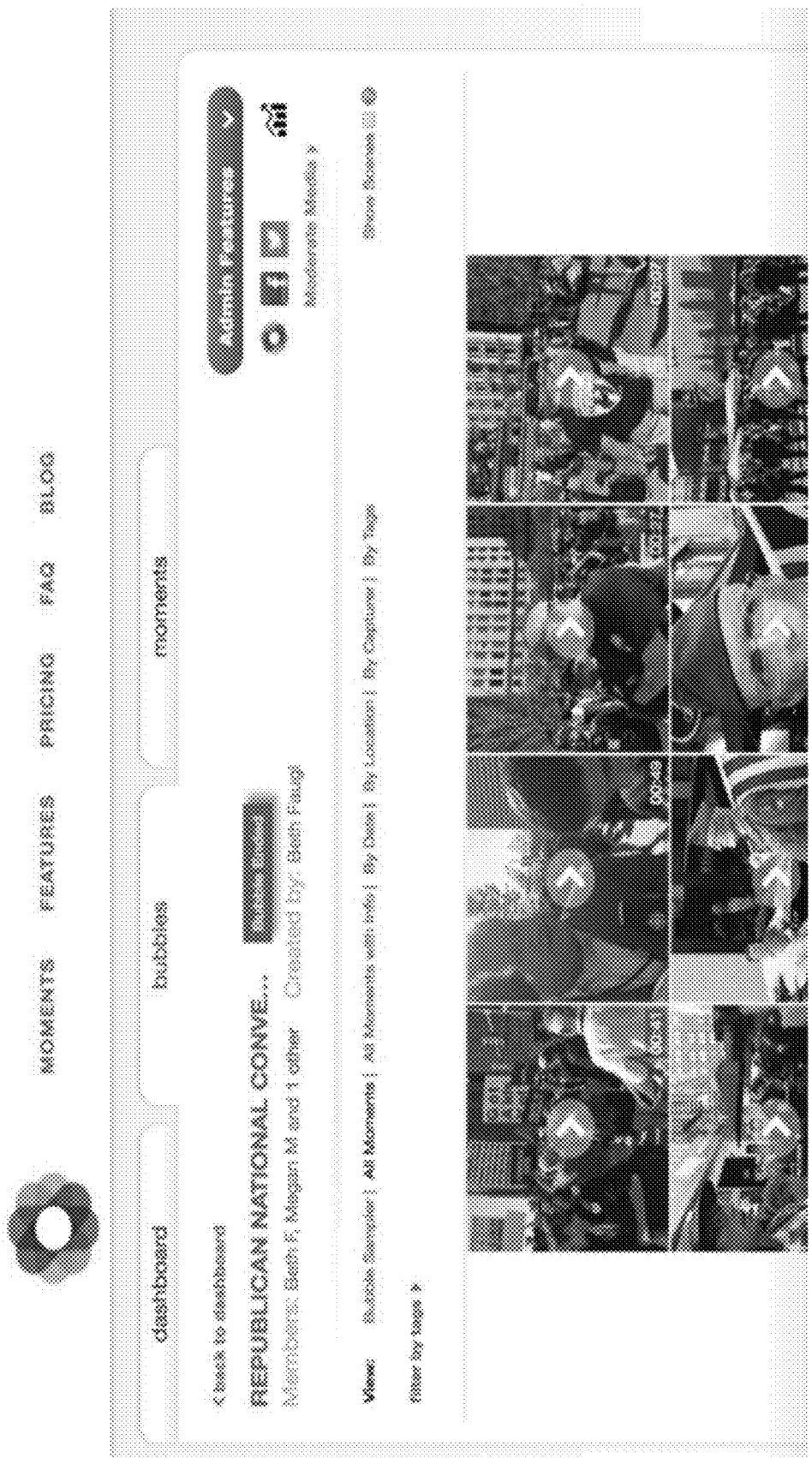
FIGS. 13A-B are diagrams illustrating a bubble and information about media in the bubble according to an embodiment.
Figure 13B:
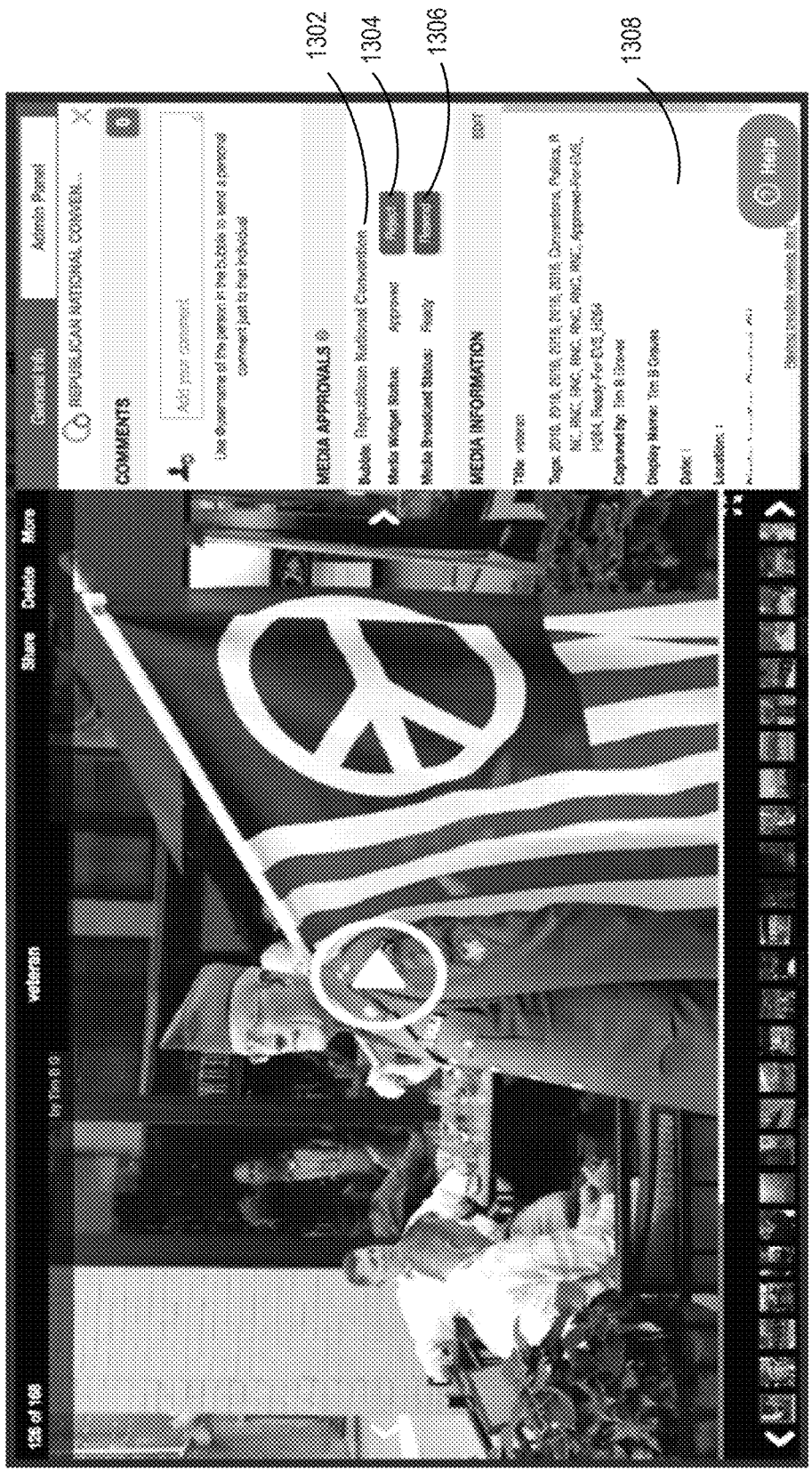

FIGS. 13A-13B are diagrams illustrating a bubble and information about media in the bubble according to an embodiment. FIG. 13A illustrates thumbnails of a variety of media in a bubble. FIG. 13B shows the selection of a particular media, with an information panel. The panel includes the bubble name 1302 and buttons for media widget status 1304 and media broadcast status 1306. A media information field 1308 includes metadata associated with the media.

III. Computer Systems for Content System and Client System

Figure 14:
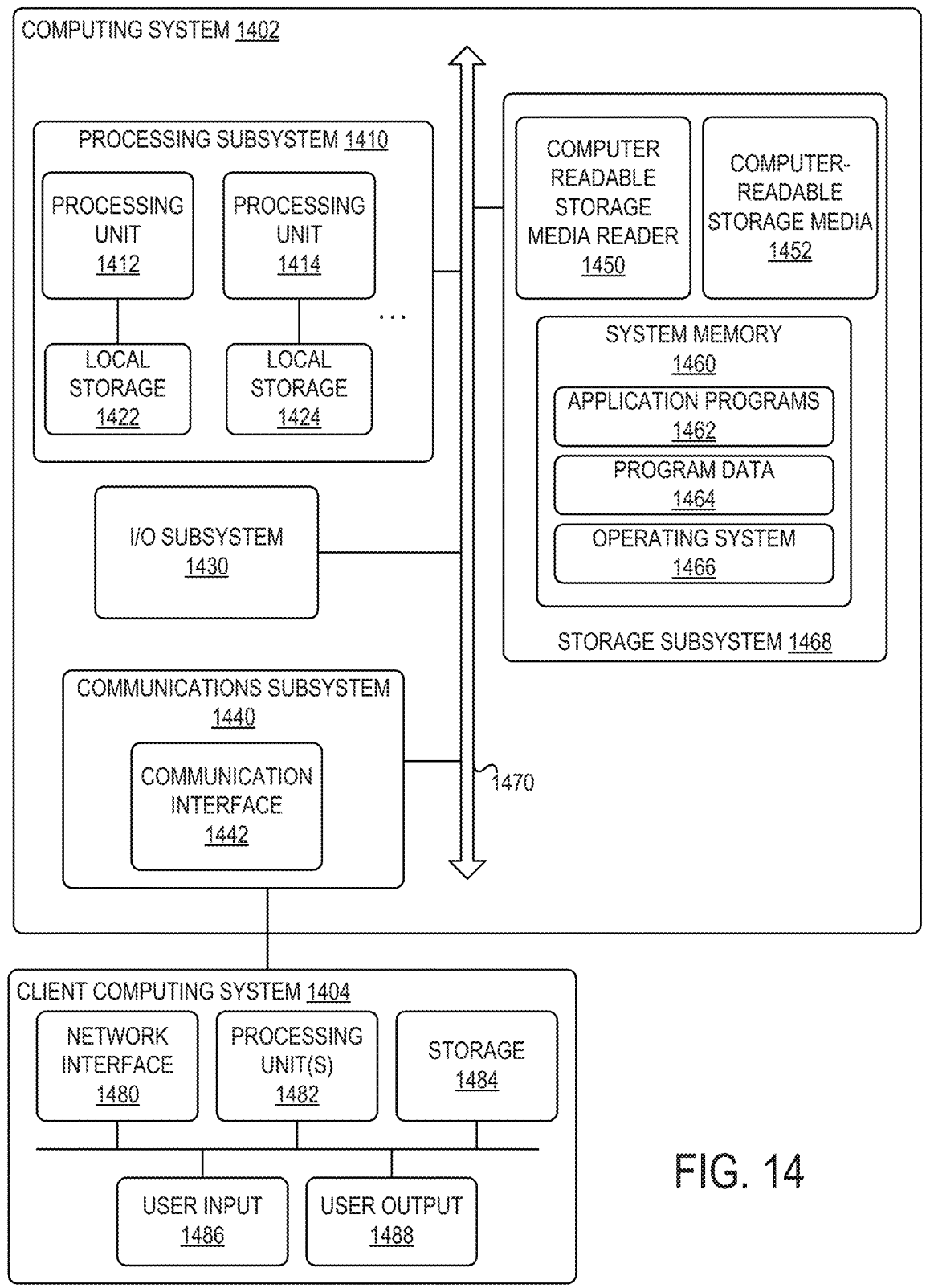
FIG. 14 is a simplified block diagram of a representative computing system and client computing system usable to implement certain embodiments.

Various operations described herein may be implemented on computer systems, which may be of generally conventional design. FIG. 14 shows a simplified block diagram of a representative computing system 1402 and client computing system 1404 usable to implement certain embodiments of the present disclosure. In various embodiments, computing system 1402 or similar systems may implement the Burst servers or computers, or any other computing system described herein or portions thereof. Client computing system 1404 or similar systems may implement user devices or broadcast destination devices, or other client systems described herein.

Computing system 1402 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 1402 may include processing subsystem 1410. Processing subsystem 1410 may communicate with a number of peripheral systems via bus subsystem 1470. These peripheral systems may include I/O subsystem 1430, storage subsystem 1468, and communications subsystem 1440.

Bus subsystem 1470 provides a mechanism for letting the various components and subsystems of server computing system 1404 communicate with each other as intended. Although bus subsystem 1470 is shown schematically as a single bus, alternative embodiments of the bus subsystem may utilize multiple buses. Bus subsystem 1470 may form a local area network that supports communication in processing subsystem 1410 and other components of server computing system 1402. Bus subsystem 1470 may be implemented using various technologies including server racks, hubs, routers, etc. Bus subsystem 1470 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 1430 may include devices and mechanisms for inputting information to computing system 1402 and/or for outputting information from or via computing system 1402. In general, use of the term "input device" is intended to include all possible types of devices and mechanisms for inputting information to computing system 1402. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 1402 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 1410 controls the operation of computing system 1402 and may comprise one or more processing units 1412, 1414, etc. A processing unit may include one or more processors, including single core processor or multicore processors, one or more cores of processors, or combinations thereof. In some embodiments, processing subsystem 1410 may include one or more special purpose co-processors such as graphics processors, digital signal processors (DSPs), or the like. In some embodiments, some or all of the processing units of processing subsystem 1410 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 1422, 1424. Any type of processors in any combination may be included in processing unit(s) 1412, 1414.

In some embodiments, processing subsystem 1410 may be implemented in a modular design that incorporates any number of modules (e.g., blades in a blade server implementation). Each module may include processing unit(s) and local storage. For example, processing subsystem 1410 may include processing unit 1412 and corresponding local storage 1422, and processing unit 1414 and corresponding local storage 1424.

Local storage 1422, 1424 may include volatile storage media (e.g., conventional DRAM, SRAM, SDRAM, or the like) and/or non-volatile storage media (e.g., magnetic or optical disk, flash memory, or the like). Storage media incorporated in local storage 1422, 1424 may be fixed, removable or upgradeable as desired. Local storage 1422, 1424 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 1412, 1414 need at runtime. The ROM may store static data and instructions that are needed by processing unit(s) 1412, 1414. The permanent storage device may be a non-volatile read-and-write memory device that may store instructions and data even when a module including one or more processing units 1412, 1414 and local storage 1422, 1424 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 1422, 1424 may store one or more software programs to be executed by processing unit(s) 1412, 1414, such as an operating system and/or programs implementing various server functions such as functions of content system 106, or any other server(s) associated with content system 106. "Software" refers generally to sequences of instructions that, when executed by processing unit(s) 1412, 1414 cause computing system 1402 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 1412, 1414. In some embodiments, the instructions may be stored by storage subsystem 1468 (e.g., computer readable storage media). In various embodiments, the processing units may execute a variety of programs or code instructions and may maintain multiple concurrently executing programs or processes. At any given time, some or all of the program code to be executed may be resident in local storage 1422, 1424 and/or in storage subsystem including potentially on one or more storage devices. Software may be implemented as a single program or a collection of separate programs or program modules that interact as desired. From local storage 1422, 1424 (or non-local storage described below), processing unit(s) 1412, 1414 may retrieve program instructions to execute and data to process in order to execute various operations described above.

Storage subsystem 1468 provides a repository or data store for storing information that is used by computing system 1402. Storage subsystem 1468 provides a tangible non-transitory computer-readable storage medium for storing the basic programming and data constructs that provide the functionality of some embodiments. Software (programs, code modules, instructions) that when executed by processing subsystem 1410 provide the functionality described above may be stored in storage subsystem 1468. The software may be executed by one or more processing units of processing subsystem 1410. Storage subsystem 1468 may also provide a repository for storing data used in accordance with the present disclosure.

Storage subsystem 1468 may include one or more non-transitory memory devices, including volatile and non-volatile memory devices. As shown in FIG. 14, storage subsystem 1468 includes a system memory 1460 and a computer-readable storage media 1452. System memory 1460 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 1402, such as during start-up, may typically be stored in the ROM. The RAM typically contains data and/or program modules that are presently being operated and executed by processing subsystem 1410. In some implementations, system memory 1460 may include multiple different types of memory, such as static random access memory (SRAM) or dynamic random access memory (DRAM). Storage subsystem 1468 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 1468.

By way of example, and not limitation, as depicted in FIG. 14, system memory 1460 may store application programs 1462, which may include client applications, Web browsers, mid-tier applications, relational database management systems (RDBMS), etc., program data 1464, and one or more operating systems 1466. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1452 may store programming and data constructs that provide the functionality of some embodiments. Software (programs, code modules, instructions) that when executed by processing subsystem 1410 a processor provide the functionality described above may be stored in storage subsystem 1468. By way of example, computer-readable storage media 1452 may include non-volatile memory such as a hard disk drive, a magnetic disk drive, an optical disk drive such as a CD ROM, DVD, a Blu-Ray® disk, or other optical media. Computer-readable storage media 1452 may include, but is not limited to, Zip® drives, flash memory cards, universal serial bus (USB) flash drives, secure digital (SD) cards, DVD disks, digital video tape, and the like. Computer-readable storage media 1452 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1452 may provide storage of computer-readable instructions, data structures, program modules, and other data for computing system 1402.

In certain embodiments, storage subsystem 1468 may also include a computer-readable storage media reader 1450 that may further be connected to computer-readable storage media 1452. Together and, optionally, in combination with system memory 1460, computer-readable storage media 1452 may comprehensively represent remote, local, fixed, and/or removable storage devices plus storage media for storing computer-readable information.

In certain embodiments, computing system 1402 may provide support for executing one or more virtual machines. Computing system 1402 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 1402. Accordingly, multiple operating systems may potentially be run concurrently by computing system 1402. Each virtual machine generally runs independently of the other virtual machines.

Communication subsystem 1440 provides an interface to other computer systems and networks. Communication subsystem 1440 serves as an interface for receiving data from and transmitting data to other systems from computing system 1402. For example, communication subsystem 1440 may enable computing system 1402 to establish a communication channel to one or more client computing devices via the Internet for receiving and sending information from and to the client computing devices.

Communication subsystem 1440 may support both wired and/or wireless communication protocols. For example, in certain embodiments, communication subsystem 1440 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 1440 may provide wired network connectivity (e.g., Ethernet) in addition to or instead of a wireless interface.

Communication subsystem 1440 may receive and transmit data in various forms. For example, in some embodiments, communication subsystem 1440 may receive input communication in the form of structured and/or unstructured data feeds, event streams, event updates, and the like. For example, communication subsystem 1440 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 1440 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 1440 may also be configured to output the structured and/or unstructured data feeds, event streams, event updates, and the like to one or more databases that may be in communication with one or more streaming data source computers coupled to computing system 1402.

Communication subsystem 1440 may provide a communication interface 1442, e.g., a WAN interface, which may provide data communication capability between the local area network (bus subsystem 1470) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 1402 may operate in response to requests received via communication interface 1442. Further, in some embodiments, communication interface 1442 may connect computing systems 1402 to each other, providing scalable systems capable of managing high volumes of activity. Conventional or other techniques for managing server systems and server farms (collections of server systems that cooperate) may be used, including dynamic resource allocation and reallocation.

Computing system 1402 may interact with various user owned or user operated devices via a wide area network such as the Internet. An example of a user operated device is shown in FIG. 14 as client computing system 1404. Client computing system 1404 may be implemented, for example, as a consumer device such as a smart phone, other mobile phone, tablet computer, wearable computing device (e.g., smart watch, eyeglasses), desktop computer, laptop computer, and so on.

For example, client computing system 1404 may communicate with computing system 1402 via communication interface 1442. Client computing system 1404 may include conventional computer components such as processing unit(s) 1482, storage device 1484, network interface 1480, user input device 1486, and user output device 1488. Client computing system 1404 may be a computing device implemented in a variety of form factors, such as a desktop computer, laptop computer, tablet computer, smart phone, other mobile computing device, wearable computing device, or the like.

Processing unit(s) 1482 and storage device 1484 may be similar to processing unit(s) 1412, 1414 and local storage 1422, 1424 described above. Suitable devices may be selected based on the demands to be placed on client computing system 1404; for example, client computing system 1404 may be implemented as a "thin" client with limited processing capability or as a high-powered computing device. Client computing system 1404 may be provisioned with program code executable by processing unit(s) 1482 to enable various interactions with computing system 1402 of a message management service such as accessing messages, performing actions on messages, and other interactions described above. Some client computing systems 1404 may also interact with a messaging service independently of the message management service.

Network interface 1480 may provide a connection to a wide area network (e.g., the Internet) to which communication interface 1440 of computing system 1402 is also connected. In various embodiments, network interface 1480 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 1486 may include any device (or devices) via which a user may provide signals to client computing system 1404; client computing system 1404 may interpret the signals as indicative of particular user requests or information. In various embodiments, user input device 1486 may include any or all of a keyboard, touch pad, touch screen, mouse or other pointing device, scroll wheel, click wheel, dial, button, switch, keypad, microphone, and so on.

User output device 1488 may include any device via which client computing system 1404 may provide information to a user. For example, user output device 1488 may include a display to display images generated by or delivered to client computing system 1404. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 1488 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1412, 1414 and 1482 may provide various functionality for computing system 1402 and client computing system 1404, including any of the functionality described herein as being performed by a server or client, or other functionality associated with message management services.

It will be appreciated that computing system 1402 and client computing system 1404 are illustrative and that variations and modifications are possible. Computer systems used in connection with embodiments of the present disclosure may have other capabilities not specifically described here. Further, while computing system 1402 and client computing system 1404 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present disclosure may be realized in a variety of apparatus including electronic devices implemented using any combination of circuitry and software.

IV. Mobile to Broadcast Integration

Figure 15:
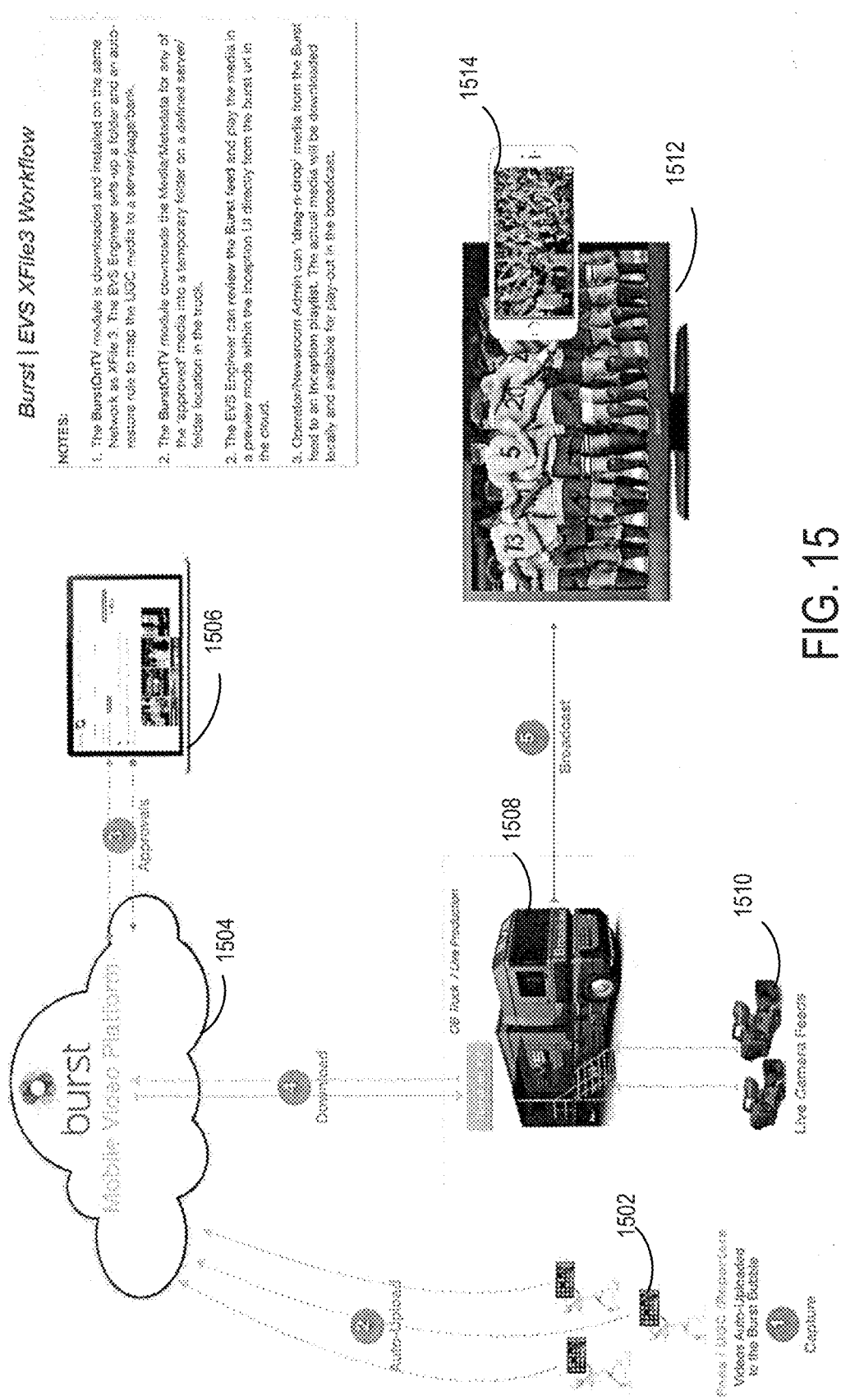
FIG. 15 is a diagram illustrating a high level system and process flow for a mobile to broadcast integration according to an embodiment.

FIG. 15 is a diagram illustrating a high level system and process flow for a mobile to broadcast integration according to an embodiment. Fans and reporters capture and upload User Generated Content (UGC) from mobile devices 1502 to the media platform 1504 over the cloud (Internet). Media platform 1504 may be implemented as or with content system 106. An editor using a computer 1506 accesses platform 1504 to approve, tag and otherwise edit submitted media. The media is then automatically transferred to a media production facility such as a studio, mobile studio, newsroom, stadium control room or truck 1508. Truck 1508 also receives feeds from live cameras 1510. The combined video is than broadcast to a display with the live feed 1512 and the UGC 1514. The combined video may have the UGC in a window, may time-multiplex with the live feed, or use any other combination.

This system allows the delivery of UGC media in very close to real time from the cloud based platform into the broadcast and production ecosystem of a media company or other company involved in video production. Client systems 1502 can access a website through an advertised URL to upload UGC. The UGC may be curated by an editor on computer 1506 (alternately a phone, tablet, etc.). The editor previews the media, looking at both the content of the media and the metadata of the media and then makes some decisions on what to do with the media. These decisions are assisted by a variety of algorithms that examine the content and metadata of the received media, and use this analysis to provide a broadcast-worthiness score for a each media to the human editor. The editor can approve a piece of media (e.g., video or photo) for either broadcast or digital. Digital approval pushes the media into an embeddable player called a widget that can be embedded into applications, a digital website, social network platforms, etc. Media approved for broadcast goes into the appropriate broadcast workflow that the customer has running.

A challenge with integrating with broadcast studios and trucks is the large number of different proprietary systems that are used for the production of different types of programming. There are differences depending upon (1) the media channel, (2) the media company, (3) the technology stack in use, and (3) the location (country). Different media channels include mobile programming, studio programming, programming for social media, programming for stadium screens, programming for a website or programming for an app. All of these are produced according to a variety of different workflows made up of a combination of hardware and software systems and people. A typical example workflow is the one that is used for producing live telecasts of sporting events. Typically, a game is being played inside of a stadium and outside of that stadium is usually a mobile unit or a truck or sometimes more than one truck that is parked there, brought there and put in place probably a day or two before the event. The truck has many cables running in and out of it and many of the cables are coming from various points in the stadium, typically from cameras that are located around the stadium. These are often fiber optic cables that are bringing digital video signals from very high fidelity cameras. The data is traveling in digital encoded video format that use a variety of different codecs over SDI (Serial Digital Interface) video input/output ports.

The digital image resolutions vary, and can be basic format resolution, HD resolution, 4K (Ultra HD), 8K, etc. Typically these cables are bringing in baseband signals into a switch and then from that switch to a router. It is similar to a computer network except that this network carries baseband video rather than Internet Protocol packets. The router performs the job of routing the signal to the right place, but this is simply an interconnect where everything comes in and out, not an Internet-type router.

The received baseband video is then processed by a variety of specialized devices, chips and software specialized for video processing at high speed. Multiple operators watch every play or action that is unfolding in the game and mark in and out points on specialized devices that are connected to their computers. For example, they may use a knob or button to mark the time of every pitch in baseball, with one operator simply marking the starting point of the pitch to the ending point of the pitch. This allows instantly bringing up the last pitch by clicking a button. Another device commonly used is a switcher which is a large specialized keyboard with anywhere from 100 to 300 buttons of various shapes and sizes. The switcher is used by a director to make instant decisions about what to switch in and out of the actual broadcast output. Inputs are coming from cameras, from graphics and from video servers.

Providing UGC from mobile devices to such proprietary broadcast studios and trucks provides a number of challenges. For example, mobile devices provide video in different formats, such as portrait video or video that is 4×3, audio that is not exactly synchronized to video, etc. Codecs used for transmitting mobile video can have different bitrates and frame rates. The broadcaster side also has many variations like this. In addition, the same media company or broadcaster operating in Europe will use a different broadcast protocol than in the U.S. Additionally, firewall protections in the broadcast studio or truck make transmission difficult.

Figure 16A:
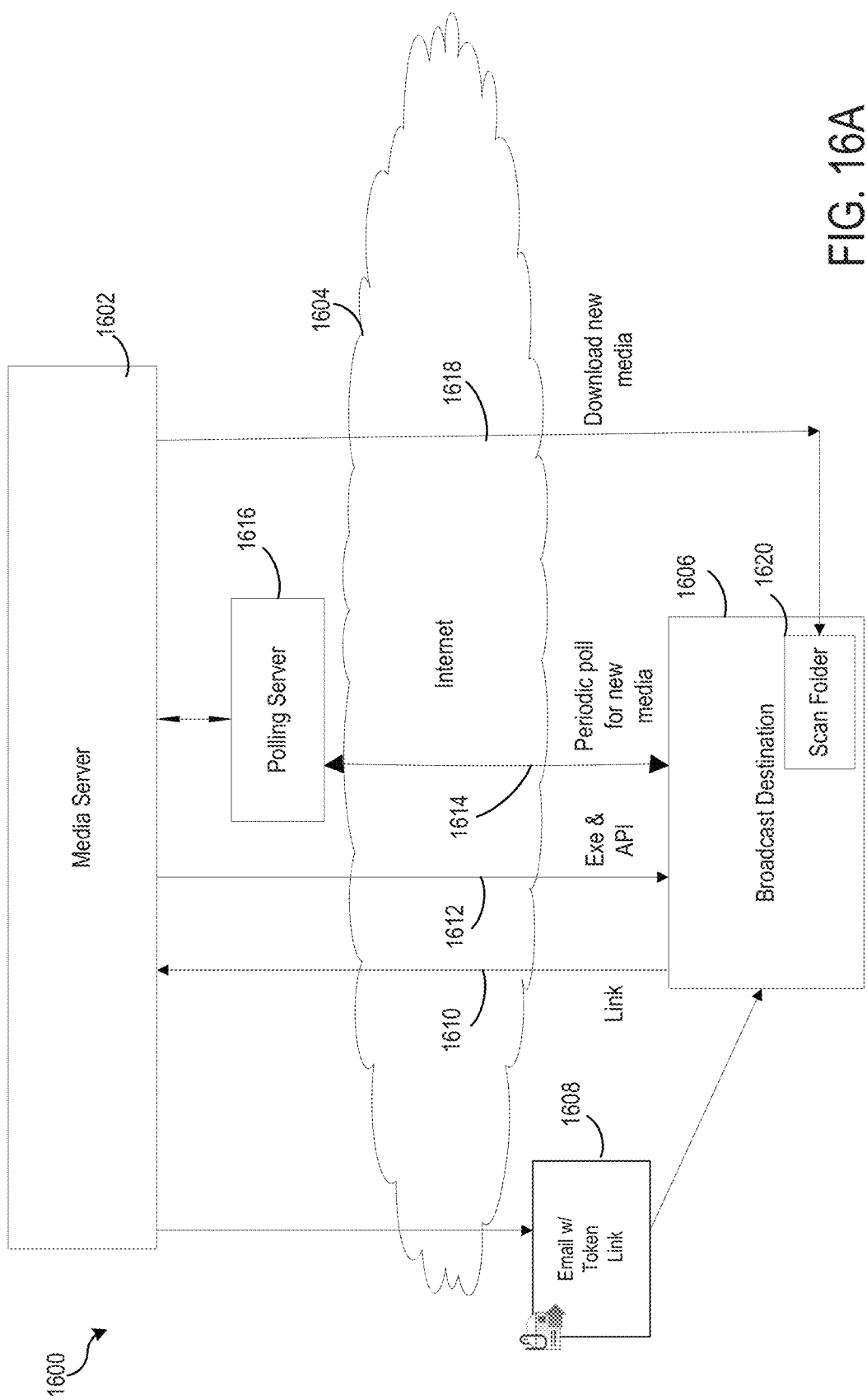
FIGS. 16A and 16B are diagrams illustrating a high level system and process flow for a mobile to broadcast integration with networking and storage according to an embodiment.

FIG. 16A is a diagram illustrating a system 1600 of the messaging flow between a media server and a broadcast destination according to an embodiment. A computer system 1602 (e.g., a media server) is part of the mobile video platform 1504 of FIG. 15. Server 1602 communicates over the Internet 1604 with a broadcast destination 1606 (e.g., truck 1508 of FIG. 15). To initiate the process, an email 1608 with a token and a link is sent to an operator at destination 1606. The email also contains instructions for the operator. An operator at destination 1606 clicks on the link in the email, which causes a communication 1610 over a communication channel with server 1602. Since the destination 1606 initiates this communication, it is able to easily traverse the firewall of destination 1606. Server 1602 then uses the opened communication channel to send an executable (program) to destination 1606. A destination may be part of a broadcast system. The executable is customized for the particular destination 1606 as discussed in more detail below. The executable will prompt the operator to provide the token, and then will use an API to establish a connection 1614 with media server 1602. Connection 1614, in one embodiment, is through an intermediate polling server 1616 in order to offload the constant polling from multiple destinations, as discussed in more detail below. When new media is available, it is downloaded to destination 1606 in a communication 1618, using the communication channel opened with connection 1614, in order to avoid firewall traversal issues. In some embodiments, the media is directly deposited in a scan folder 1620 or other storage designated by destination 1606, and a preconfigured broadcast system then picks up the media file and metadata file and transcodes and ingests it into the appropriate downstream playout or asset management system. In other embodiments, the executable (program) makes proprietary API calls to the downstream broadcast system to generate a metadata file, and then communicate the metadata and the media into the broadcast system, and notify the operator that new media has just arrived from the cloud. Alternately, instead of using a scan folder, media can be handed off by, for example:

(1) Making API calls to a downstream media production system to push media and metadata into them (as opposed to letting them scan a folder where media and metadata are placed) (In one embodiment, a Newtek Tricaster production system is used);

(2) building download and UI engines into a media production system's UI and engine (such as with Adobe Premier and AVID MediaCentral); and (3) pushing an XML file into a media production system which gives it the cloud locations and metadata of freshly approved media (e.g., using a Ross Xpression graphics system).

In one embodiment, the executable is customized for the following executable parameters:

environment: '{ENVIRONMENT}'
environment: prod

-continued

```
mail:
    host: secure-mail.burst.com
    port: 25
    to: support@burst.com
    password:
    from: secure-mail@burst.com
    subject: BurstOnTV logs sent by user from {0}.
    body: operator from {0} needs support.
    key_name: ./burstontv.secure-mail-client.key
    cert_name: ./burstontv.secure-mail-client.pem
app:
    short_name: BoTV
    long_name: BurstOnTV
    display_name: Burst on TV
    version: 6.1.0
    revision: asdfasdf
    use_ssl: False
    executable_file_name: BurstOnTV
api:
    host: localhost
    port: 5001
    threaded: True
    static_port: 5001
    use_static_port: True
    auto_update_dir_name: .autoupdate
    check_auto_update_interval_sec: 3600
    self_test_interval_sec : 21600
    check_target_instance_info_interval_sec : 900
    log_send_interval_sec : 600
    delete_media_interval_days : 10
    track_db_interval_hrs : 24
    thumbnail_mime_type_id: 400
    self_test_result_publish_wait_time_sec: 120
    check_engine_running_location_sec: 30
    scan_folder_name:
        adobe: Burst Media Folder
media:
    check_interval_sec: 30
    checksum_verification: True
    tmp_file_prefix: tmp.botv.media_file
    file_name_template: '{media_title}_{media_id}.{media_file_ext}'
    #Add the absolute directory path to put downloading chunks.
If nothing specified and
flavor is not evs it creates default_tmp_dir "tmp" created at
current directory in windows and in mac its under /content/resources
    tmp_dir:
    tmp_dir_name: 'Downloads'
    tracker:
        done_dir:
        error_dir:
        display_count: 50
        file_path: ./media_tracker.db
        timeout_hours: 72
        adobe:
            terminal_state: 'S'
        evs:
            terminal_state: 'S'
        avid:
            terminal_state: 'S'
        evertz:
            terminal_state: 'S'
        mp4:
            terminal_state: 'D'
        ross:
            terminal_state: 'D'
meta_data:
    defaults:
        bubble_title: NoTitle
        media_title: NoTitle
        capturer_name: Anonymous
        location:
broadcast:
    avid:
        media_director:
            # display_capturer_name instead of capturer_name?
            file_name_template:
'{bubble_title}#{media_title}#{capturer_name}#{media_id}.{media_file_ext}'
    evs:
```

-continued

```
    xfile3/xsquare:
        endpoint_url: http://localhost:9002/XsquareJobService
        username: Administrator
        password: evs
        agent_name: Job ID Burst
        agent_machine_name: localhost
        agent_username: Burst
    newtek:
      tricaster:
        endpoint_url: http://localhost:5952
        shortcut_comment: 'From: {capturer_name}, Title: {bubble_title},
Location: {location}'
        shortcut_display_message: 'You have a new Burst
    {display_media_type} called
"{media_file_name}" under {display_ddr}[{display_play_list}]!'
network_check_timeout_sec: 10
preferred_encoding: utf-8
photo_mime_type: 202
```

Figure 16B:
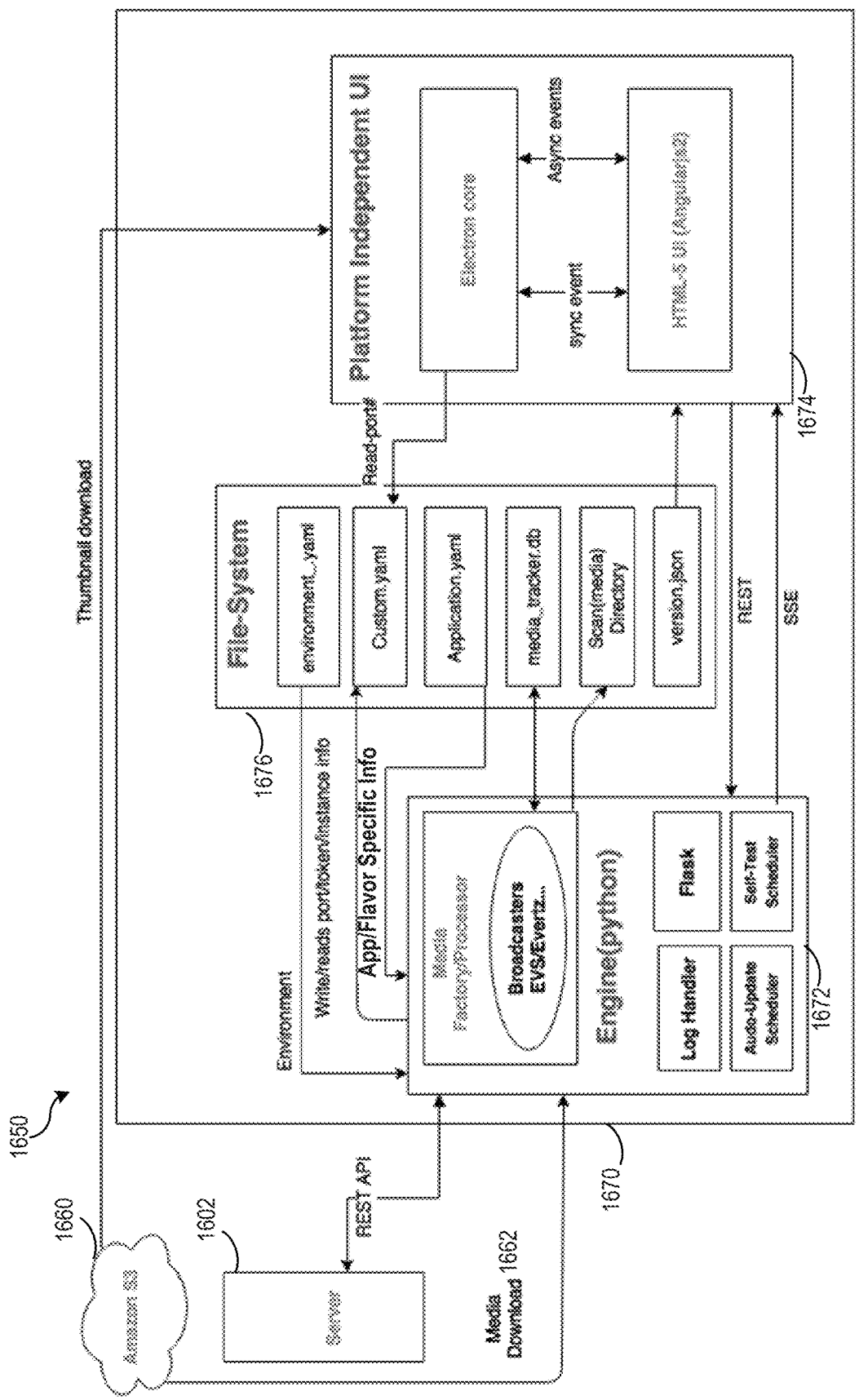

FIG. 16B illustrates a system 1650 of communication between a media server and a broadcast destination according to an embodiment. Server 1602 may be implemented in or with content system 106. System 1650 may implement all or some of the techniques and/or elements of system 1600. Server 1602 may be implemented as a cloud-based content distribution and communication system. Server 1602 may utilize a data store, such as a cloud-based storage service to store media content. Examples of cloud-based storage services may include storage service Amazon S3 provided by Amazon Corporation.

Server 1602 provides one or more interfaces (e.g., APIs) for communication with a broadcast system. In some embodiments, the file 1670 may be provided to a system (e.g., a production system) that works with a broadcast system for broadcast of media content. Server 1602 may provide a single file 1670 including program code that is implemented as a client at or with a production or broadcast system. The file 1670 may be provided for client-side implementation by server 1602 to a broadcast system. The executable file 1670 may include multiple components including engine 1672, files 1676, and user interface 1674. Files 1676 may be stored in a file system of a computer system of a broadcast system.

Engine 1672 may be implemented using one or more program code languages, such as Python. Engine 1672 may include one or more subsystems and/or modules, such as a media factory/processor, a log handler, a flask, an auto-update scheduler, and a self-test scheduler. Engine 1672 may facilitate communication between server 1602 and a broadcast system. Server 1602 may provide one or more interfaces (e.g., a REST-based interface) for communication. Engine 1672 may download media 1662 from server 1602 stored at storage service 1660.

Flask handles communication with server 1602 including calls using an interface of server 1602, such as REST-based communication. Flask may facilitate communication with user interface 1674 using message-based communication. Engine 1672 may utilize flask to communicate information about events, such as a status of media content to be provided to a broadcast system. Examples of communication may include HTTP-based communication using server-side events (SSE) to communicate events about the status (e.g., media progress or media downloading) of media content that is downloaded. Engine 1672 maintains a persistent connection to server 1602 to obtain updates. Flask handles communication of those updates as SSE to the user interface 1674.

Media factory/processor in engine 1672 handles the bulk of processing to obtain media from server 1602. Media factory/processor handles direction of content and processing to provide media content to a broadcast system. In some embodiments, media factory/processor can handle processing of media according to different flavors, or configurations for a broadcast system.

Log handler handles processing to generate and manage log of activity in the system. Auto-update scheduler communicates with server 1602 to detect and automatically updates the file 1670. Self-test scheduler downloads media from server 1602 and automatically tests the media to ensure that it can be downloaded and can be provided to the broadcast system.

User interface 1674 may be implemented using a variety of techniques. User interface 1674 may be implemented to enable a user of a broadcast system to manage and control of UGC into a broadcast. User interface 1674 may be implemented as part of a standalone application. In such embodiments, user interface 1674 may be implemented using programming code based on a an Electron core (e.g., Google Chrome based programming interface packaged into a desktop application that allows web applications to run as desktop applications). User interface 1674 can be implemented in an interface of a broadcast system. For example, user interface 1674 may be implemented using one or more programming languages, such as a scripting language (e.g., HTML-5 based on Angular JS) supported by a plug-in to implement user interface 1674 into an interface of a broadcast system. In some embodiments, user interface 1674 may be implemented as a panel or container of an application having a graphical interface. For example, user interface 1674 may be implemented as a container or panel in a product such as Adobe Premiere Pro.

User interface 1674 can be implemented as a standalone application to enable access to a file system at a broadcast system for handling media content from server 1602. User interface 1672 handles event processing in an asynchronous manner and/or a synchronous manner depending on the implementation of the user interface 1672. In some embodiments, the electron core and the HTML5-based user interface may communicate with synchronous and/or asynchronous events.

Files 1676 may be generated based on or included in file 1670. Each of files 1676 may be stored in a file system of a broadcast system. Each of files 1676 may be stored as or include a data structure of information for processes performed at a broadcast system using file 1670. Some or all of files 1676 may be in a format of a markup language such as YAML. The files 1676 may include one or more parameters for execution of the engine, user interfaces, and/or applications executing at a broadcast system based on file 1670. The parameters may be overridden based on values in the files 1676, unless not specified. Each of the files 1676 may be configurable to adjust one or more parameters. In some embodiments, one or more of files 1676 maybe received (e.g., pushing or pulling) from server 1602 including updates.

One of files 1676 (e.g., environment.yaml) defines an environment of execution for engine 1672. A file about the environment may include markup language (e.g., YAML) such as the following:

```
environment: '{ENVIRONMENT}'
environment: prod
```

The environment may indicate a type of environment, such as production.

In some embodiments, one or files 1676 may indicate information about communication configurations, such as mail communication. The following is an example of a mail system configured for communication about media access through the system. Engine 1672 may communicate one or more emails to users of content system 106 about operation of the engine, including log information.

```
mail:
    host: secure-mail.burst.com
    port: 25
    to: support@burst.com
    password:
    from: secure-mail@burst.com
    subject: BurstOnTV logs sent by user from {0}.
    body: operator from {0} needs support.
    key_name: ./burstonty.secure-mail-client.key
    cert_name: ./burstonty.secure-mail-client.pem
```

One of files 1676 (e.g., custom.yaml) defines a custom configuration for an environment of engine 1672. The custom configuration may be specific to a customer (e.g., a broadcaster) and/or a broadcast product by the customer. Examples of custom parameters are shown below. Each parameter may be specific to one or more customer-specific production and/or product systems.

```
broadcast:
    avid:
        media_director:
            # display_capturer_name instead of capturer_name?
            file_name_template:
'{bubble_title}#{media_title}#{capturer_name}#{media_id}.{media_file_ext}'
    evs:
        xfile3/xsquare:
            endpoint_url: http://localhost:9002/XsquareJobService
            username: Administrator
            password: evs
            agent_name: Job ID Burst
            agent_machine_name: localhost
            agent_username: Burst
    newtek:
        tricaster:
            endpoint_url: http://localhost:5952
            shortcut_comment: 'From: {capturer_name}, Title: {bubble_title}, Location: {location}'
            shortcut_display_message: 'You have a new Burst {display_media_type} called
"{media_file_name} under {display_ddr}[{display_play_list}]!'
network_check_timeout_sec: 10
preferred_encoding: utf-8
photo_mime_type: 202
```

One of files 1676 (e.g., application.yaml) defines one or more parameters, for example as shown below, for an application in which a user interface 1674 in an application is provided for media content.

```
app:
    short_name: BoTV
    long_name: BurstOnTV
    display_name: Burst on TV
    version: 6.1.0
    revision: asdfasdf
    use_ssl: False
    executable_file_name: BurstOnTV
    api:
        host: localhost
        port: 5001
        threaded: True
        static_port: 5001
        use_static_port: True
    auto_update_dir_name: .autoupdate
    check_auto_update_interval_sec: 3600
    self_test_interval_sec : 21600
    check_target_instance_info_interval_sec : 900
    log_send_interval_sec : 600
    delete_media_interval_days : 10
    track_db_interval_hrs : 24
    thumbnail_mime_type_id: 400
    self_test_result_publish_wait_time_sec: 120
    check_engine_running_location_sec: 30
    scan_folder_name:
        adobe: Burst Media Folder
```

The parameters may include an SSL parameter for communication with a cloud environment, such as server 1602 implemented as a cloud-based system. The parameters for API is for controlling client-server communication between a broadcast system computer and a client on which file 1670 is implemented. The parameters may be used as part of a port detection process to determine a port for communication. Some of the parameters may be for updating the environment. Some of the parameters may be for self-test of media content download. Some parameters may be used for thumbnail configuration for display in a user interface.

Media tracker DB (e.g., media_tracker DB) is a data store generated based on one or more of files 1676. Media tracker DB keeps track of status of media content access (e.g., download) status, progressive, parts, ingestion downstream, etc. The media tracker DB may be used by the engine to provide engine to interface updates about the status of media content access.

Scan media directory is generated based on one of files 1676 to store media content. In some instances, media content may be obtained from downstream systems. The parameters show below as examples of parameters for media content storage and access. Some of the parameters may be broadcast system and/or product specific. Terminal state parameter may indicate a tracking of status of ingestion of media content.

```
media:
    check_interval_sec: 30
    checksum_verification: True
    tmp_file_prefix: tmp.botv.media file
    file_name_template: '{media_title}_{media_id}.{media_file_ext}'
    #Add the absolute directory path to put downloading chunks.
If nothing specified and flavor is not evs it creates
default_tmp_dir "tmp" created at current directory in windows
and in mac its under /content/resources
    tmp_dir:
    tmp_dir_name: 'Downloads'
    tracker:
        done_dir:
        error_dir:
        display_count: 50
        file_path: ./media_tracker.db
        timeout_hours: 72
        adobe:
            terminal_state: 'S'
        evs:
            terminal_state: 'S'
```

```
avid:
   terminal_state: 'S'
evertz:
   terminal_state: 'S'
mp4:
   terminal_state: 'D'
ross:
   terminal_state: 'D'
```

One of files 1676 may be a JSON file (e.g., version.JSON) that is used for Angular JS to keep track of application versions. The application versions may be used to determine the latest copy of a user interface from server 1602.

One of the files 1676 may be for metadata media content and bubbles. Examples of parameters for metadata are shown below.

```
meta_data:
   defaults:
      bubble_title: NoTitle
      media_title: NoTitle
      capturer_name: Anonymous
      location:
```

Figure 17:
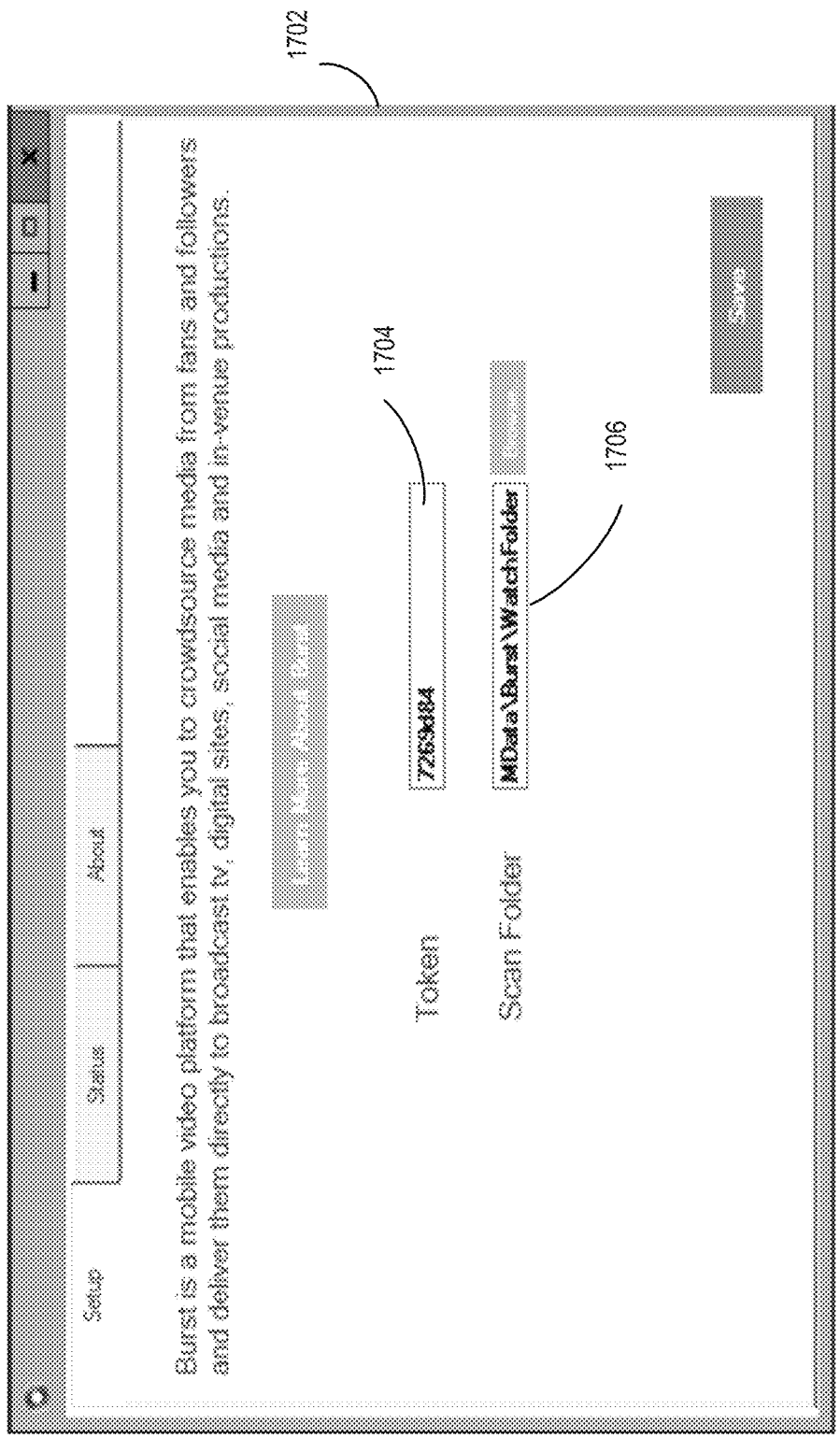
FIG. 17 is a diagram illustrating the UI of a downloaded executable prompting a destination operator to enter a token and scan folder.

FIG. 17 is a diagram illustrating the UI of a downloaded executable prompting a destination operator to enter a token and scan folder. A window 1702 is presented to the destination operator by the executable application. The user then enters the token received via email in token field 1704. If the destination has a scan folder to which UGC media is to be downloaded, the path to that scan folder is entered in a scan folder field 1706.

Table 1 below shows an embodiment of a portion of a database for identifying the parameters for a particular broadcast destination.

In one embodiment, the metadata includes a watermark which is superimposed on the media, such as a network or sponsor logo. In one embodiment, the destination table uses a series of common modules in a library. For each new customer, the particular desired modules are selected, with additional ones added as needed.

Figure 18:
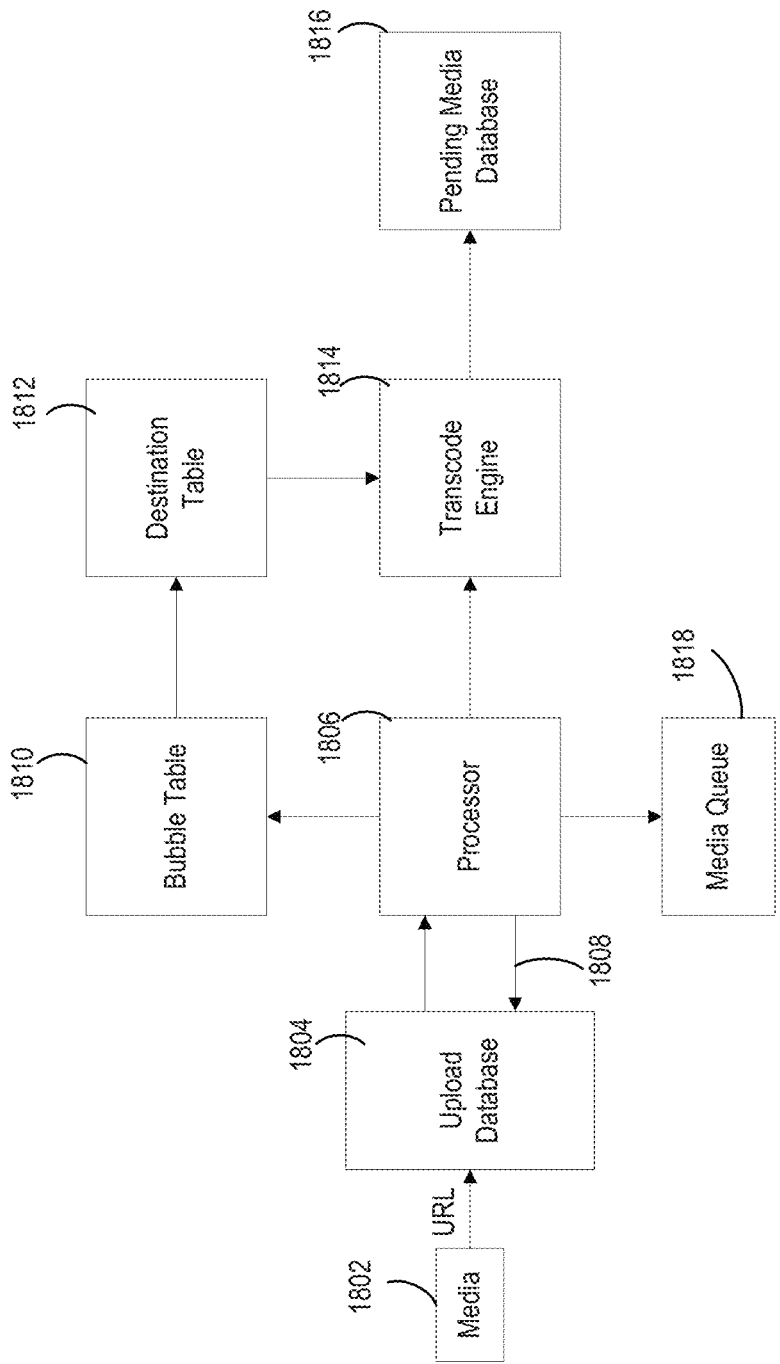
FIG. 18 is a diagram of the parameter conversion process according to an embodiment.

FIG. 18 is a diagram of the parameter conversion process according to an embodiment. Media 1802 is uploaded to upload database 1804 with a URL identifying a particular bubble. The media and metadata, including the URL, is provided to a processor 1806. Processor 1806 provides the bubble URL to a bubble table 1810, which looks up the corresponding destination. The destination is provided to a destination table 1812, such as table 1 above. The parameters for the destination from the destination are provided to a transcode engine 1814. Processor 1806 provides the media 1802 to transcode engine 1814, where it is converted into the proper protocol, format and metadata. The converted media is then stored in a pending media database 1816, and the location of the converted media is identified in a media queue 1818. Once the media is approved by an operator or editor, it is ready to be downloaded instantly in the converted state.

In one embodiment, the API passes the token in the initial call and the media server validates the token or rejects it. If it is validated, the media server knows what destination the token was assigned to, what bubble(s) are connected to it, what external systems it is connected to, etc.

In one embodiment, portions of the metadata can be optionally superimposed on the media, depending upon the broadcaster's desires. For example, graphics such as the name of the person submitting the media, the location and the time. Another example is a broadcaster's pre-created graphic, such as a phone border, to surround the video, with a sponsor name on the phone border.

TABLE 1

| Account | Destination | Email | Protocol | Format | Metadata |
|---------|-------------|-------|----------|--------|----------|
| Fox News | Truck 1 | xxx@fox.com | REST API | codec<br>bitrate<br>frame rate<br>aspect ratio<br>orientation<br>(portrait/landscape)<br>audio sampling rate<br>broadcast system<br>(NTSC, PAL, SECAM, ME-SECAM, etc.)<br>Scan Folder or API call<br>Done/Error Folder supported<br>Done/Error folder<br>custom names<br>If API based media<br>transfer: protocol,<br>port, IP, method | File type<br>Contents<br>(Title, Timestamp,<br>location, tags,<br>device type, etc.)<br>Location<br>Objects detected<br>in video<br>Capturer name and<br>email |
|  | Truck 2 | . . . | . . . | . . . | . . . |
|  | Studio 1 | . . . | . . . | . . . | . . . |
| ABC | Studio 43 |  | Watch Folder |  |  |

Table 1 is a high-level diagram, and additional details are included in the table. For example, the destination may include:
Destination name
Destination type
Token & expiration date/time
Notes
Metadata capability In another embodiment, additional metadata is provided for use by the broadcaster. For example, additional metadata can include what bubble the media came from (e.g., what promotion), tags that have been applied either by the submitter or the producer, comments (e.g., instructions for operators in the broadcast truck, consumer comments, etc. In one embodiment, at least the following 10 fields are sent:

Media Type (Photo/Video),
Original capture date and time,
Original capture location (coordinates, city, state, zip),
Title,
Tags (such as touchdown, interview, cheerleaders, etc.),
Objects detected within video (dog, cat, cloud, building, etc.) including offsets at which these objects were detected,
Types of audio detected within video (such as music, singing, speech, applause, etc.).

In one embodiment, the metadata format preference is indicated by the broadcaster and stored in the destination table. The metadata can be provided in JSON format and then converted into the desired metadata format, such as XML files, JSON (JavaScript Object Notation), XMP (Extensible Metadata Platform), plain text files, metadata embedded into filenames, etc.

A significant piece of metadata is the timestamp or time code for the metadata. That allows the broadcaster to match up the UGC (e.g., fan reaction) with what was happening in the broadcast at that time. The time codes are searchable, so that a broadcaster can search for UGC for a particular point in time. The other data is searchable as well, including location, etc.

In one embodiment, the UGC media platform described above is integrated with a multi-destination cloud platform, such as C-Cast from EVS. A C-Cast operator can be watching all the different games on different monitors, and, for example, pull the three best camera angles for a goal in a soccer match. In addition to the camera feeds, UGC feeds are provided as well for selection. The operator can build a quick montage that is based on various camera angles of the goal, interspersed with audience reactions from around the globe self-submitted by the audience.

In one embodiment, the token described above is a password or other identifier. The token has an associated expiration date for security reasons. A default expiration date is 30 days, in one example. A broadcaster can specify a token expiration date when setting up a bubble. For example, if the bubble is for an event or game, the token may expire after the event or game is over, or a few days afterward. In one embodiment, multi factor authentication is used. The user first logs into the media server using multi factor credentials—such as a password and then the token.

In one embodiment, the executable described above is a custom executable for the desired destination. In another embodiment, the same executable is downloaded for multiple destinations but with a configuration setting to select the particular parameters for that destination. The executable includes multiple modules. One module is constantly polling the cloud for new media. Another module is monitoring that polling module or engine. Another module is the user interface. A fourth module is an auto updater to detect and automatically update with new releases. In one embodiment, the executable monitors the scan folder for a variety of problems, such as deletion or other errors. The destination operator can be notified to rectify the problem so the scan folder is available when media arrives.

In one embodiment, a polling server 1616 is used as described above to facilitate scaling. For example, if there are 100 trucks or studios, each of which is polling for new media every 30 seconds, this can consume a lot of processing power of media server 1602. In addition, there are additional calls made, such as for new versions, configuration changes, signaling checks, etc. The use of polling server 1616 enables an event driven model. In one embodiment, the polling server uses an Amazon AWS Lambda Function or similar function. The Lambda function checks an Amazon queue, which can be implemented with an SQS simple queuing service. The media server 1602 places a message in the queue any time there is something to be done with a particular destination. For example, if a new piece of media has just been approved for a particular destination, that is relayed to the queue for that destination so the next time a ping comes from that destination it gets a notification. But the majority of the pings when there is nothing new in the queue receive no response or simply receive a response that there is no new information. This polling mechanism solves major problems with push-based approaches (i.e. where a cloud server tries to push media into a broadcast system) such as opening up inbound firewall ports in these security-sensitive broadcast environments, and keeping NAT (Network Address Translation) pinholes open over these inbound connections over long periods of time.

In one embodiment, Python is used on the back end for an engine that runs as a service in the executable downloaded to the broadcast destination. The front end executable at the destination uses HTML 5 and a browser-based UI. This UI is packaged into a container such as Electron to provide full access to Operating System resources while maintaining the look-and-feel as well as technical benefits of a web UI. The engine on the back will not only serve the purpose of an agent that is connecting to the cloud but also be a mini web server. This allows a web UI which can incorporate modern universally used controls that the operators would be familiar with. This also makes the UI portable so that it can port to run on Mac and Windows or in the cloud or VM. One example for small broadcasters is the use of Adobe Premiere Pro. In one embodiment, a tool (e.g., Electron) is used to package the browser into an application. Thus, rather than launch the HTML 5 UI in a regular browser it is launched inside the Electron tool. This provides access to certain resources on that computer that the browser normally wouldn't have, and avoids browser security limitations. Users then do not have to separately go to the media server in another browser. This allows the approval of media in one tab (using a web UI that talks to the cloud media servers) and seeing the downloaded media in another tab (using a web UI that talks to the python engine running locally. Alternately, a single tab can be used and the user can drag the approved media into a scan or other folder. Thus, there is only one UI and it allows dragging the media from that UI into the broadcaster's own app. In one embodiment, this is run as a panel inside the broadcaster UI.

In one embodiment, as described above, media is delivered to a broadcast destination scan folder. Some systems have a scan folder or watch folder, so when media is placed in the folder, the folder is constantly watched by the broadcast destination. To deliver to the scan folder, the destination provides the location of the scan folder in the broadcast destination system. Other systems use a sidecar button. In some systems, XML is used, requiring a call to EVS software called XSquare. XSquare reads the media header and container level information and it generates an XML file and returns it. The custom metadata coming from the cloud UGC flow can then be added to the appropriate position in the tree structure of the XML, file. Another technology is a UNIX C socket connection. A socket connection is made to a piece of hardware that is running on the broadcast destination software and the media is pushed like a stream to this socket connection along with the metadata. A specific API call is made to notify the broadcast destination that the media and metadata has been transferred.

In one embodiment, an error check is conducted when media is downloaded. In one embodiment, the media download function or the executable detects whether the ingestion of media succeeded or not. A particular error check code module is enabled depending upon the configuration of the broadcast destination. In one example, the scan folder is monitored to see if the media is moved to a Done folder, which indicates successful downstream ingestion. If it is moved to an Error folder then it was not successful and that information will be flagged to the media server in the cloud on a management console. The management console displays the current status of which media is being approved but not yet ready, which ones are ready and waiting to be downloaded, which ones are downloaded but not getting ingested and which ones are ingested and successful, and which are ingested but unsuccessful. A report on the ingestion is sent back to the media server in the cloud using the API.

In one embodiment, the media server is configured to include integration with certain external vendors used by a broadcast destination. For example, a destination may use EVS outside broadcast digital production systems or E-Works. Each of those systems may have different versions. The destination account on the media server is enabled for these external systems, for the particular version used. The particular destinations (trucks, studios) of the destination account using those systems are flagged in the destination table. A token is created for communication with those systems (e.g., the logon and the password the destination uses). A different token may be required for different destinations, and will be needed for each external system. The external system can then be indicated as a target for the uploaded UGC, instead of a scan folder or other destination database location, or in addition to such a location.

In one embodiment, test media is sent to the destination. A diagnostic/monitoring tool gives information on what is happening. A diagnostic check is done on that media and then a notification is sent to both the media server and the destination operator.

In one embodiment, a single URL may be used for multiple events, and then the metadata can be examined to assign UGC to an event. For example, every weekend there may be about 30 football games and each game has two teams. Each team has a page on the customer's website. A schedule can be provided by the broadcaster to the media server that identifies which dates, at what times, at what location, which two teams are going to be playing. A call to action to the entire market throughout the whole season that can then be provided with just one URL. The media server uses the schedule and the fact that location and time of capture metadata is provided with the UGC media, to automatically detect what games that media might be for and then automatically tag that media with the two tags—one for each of the two teams that must have played in that game. A keyword bubbles feature is then used to automatically route media from one bubble to another bubble based on the tags the media has set up. There may be perhaps 50 bubbles, one for each team. Each media that comes in gets sent to the two different bubbles that pertain to those two different teams.

In one embodiment, the metadata is used to assign media to bubbles even without a schedule. One option is the use of a catch-all button and advertisement of one call to action with one URL. People can then submit media and it will go into the catch-all bubble. The metadata can be examined to determine location and time and pair it with an event. Alternately, other metadata or information in the media can be used. For example, detection of objects inside the video and detection of concepts inside the video can be used. For example, if the video looks like a snowstorm it can be assigned to a weather bubble. Such submissions could be provided to a generic non customer-specific destination website for later sorting.

In one embodiment, the media database contains the local cache of information about which media has been downloaded and which state are they in. Is it currently being downloaded? Has it been downloaded and then has it been ingested? Has it been successfully ingested? All of that information is stored inside of the local database which gets flushed periodically. The User Interface (UI) provides the ability to see which media are approved, which ones are not approved, etc.

In one embodiment, content other than UGC is delivered to a broadcast destination. For example, a service providing statistics may provide data which can be downloaded. In one example, a destination operator may specify the names of players for a game, and have statistics and information about those players queued up for download when needed during a live broadcast. The information can be downloaded to add to the broadcast, or can simply be downloaded and placed in a window viewable by an announcer.

While this disclosure has been described with respect to specific embodiments, one skilled in the art will recognize that numerous modifications are possible. Embodiments of this disclosure may be realized using a variety of computer systems and communication technologies including but not limited to specific examples described herein.

In one embodiment, multiple bubbles can be connected to a single destination. This means that media from multiple events or topics of interest (such as say a Weather storm and a Sports game), represented by different bubbles each receiving crowdsourced as well as editorially controlled media content, can be routed to the same destination, such as a Newsroom broadcast system.

In one embodiment, a single bubble can be connected to multiple destinations. Thus, media coming from a single game for example, can be routed to both a truck and a studio, feeding a live telecast as well as post-game highlights production.

In one embodiment, multiple bubbles can be connected to a single destination. This means that media from multiple events or topics of interest (such as say a Weather storm and a Sports game), represented by different bubbles each receiving crowdsourced as well as editorially controlled media content, can be routed to the same destination, such as a Newsroom broadcast system that is putting together the nightly news.

In one embodiment, multiple bubbles can be connected to multiple destinations. In this most sophisticated setup, crowdsourced as well as editorially controlled media from multiple events or topics of interest (such as say multiple games in progress concurrently at an Olympics), represented by different bubbles, can all be feeding multiple destinations each, such as network broadcast centers, trucks, studios in the countries of origins of the teams playing, and so on. The system is global in its scope and reach, and at the same time be feeding NTSC media into a US based truck while feeding PAL versions of the same media to a European broadcast center, all in real time.

Embodiments of the present disclosure may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although this disclosure has been described with respect to specific embodiments, it will be appreciated that this disclosure is intended to cover all modifications and equivalents within the scope of the following claims.

What is claimed is:

1. A method for providing user generated content (UGC) to a media production or broadcast destination for inclusion in a broadcast or other media distribution, the method comprising:
    receiving, at a media server, from a media production or broadcast destination computer, one or more video format parameters of the media production or broadcast destination;
    customizing, by the media server, a transcoding of media based on the video format parameters of the media production or broadcast destination;
    receiving, at the media server, one or more media parameters and one or more metadata processing parameters of the media production or broadcast destination;
    customizing, by the media server, an application using the one or more media parameters and the one or more metadata processing parameters to provide a customized application;
    transmitting, by the media server, to the media production or broadcast destination computer, a token and a link to the media server;
    detecting, by the media server, an access of the link by the media production or broadcast destination computer;
    downloading, by the media server, the customized application with an application programming interface (API) from the media server to the media production or broadcast destination computer; and
    periodically receiving at the media server polling of the API by the customized application at the media production or broadcast destination computer for the user generated content (UGC).

2. The method of claim 1 wherein the video format parameters include at least one of a bit rate, a frame rate, an aspect ratio, an orientation, an audio sampling rate, a broadcast system type, a media distribution system type, or a combination thereof.

3. The method of claim 1 further comprising:
    receiving, from the media production or broadcast destination computer, one or more custom parameters for media;
    receiving new UGC;
    transcoding the new UGC using the one or more custom parameters to generate transcoded new UGC; and
    downloading the transcoded new UGC to the media production or broadcast destination computer.

4. The method of claim 3 further comprising:
    receiving a scan path to a media destination at the media production or broadcast destination computer
    customizing the customized application with the scan path; and
    directing, by the customized application, the transcoded new UGC to the media destination indicated by the scan path.

5. The method of claim 1 further comprising:
    designating a URL for an event associated with the media production or broadcast destination computer, the URL indicating a bubble;
    publishing the URL for the event to one or more users; and
    receiving the UGC at the bubble indicated by the URL.

6. The method of claim 1 further comprising:
    receiving a destination token;
    transmitting, to the media production or broadcast destination computer, any user generated content including the destination token;
    wherein the token is a password or other identifier.

7. The method of claim 1 wherein the transmitting a token and a link to the media production or broadcast destination computer is done via email.

8. A computer product comprising a non-transitory, computer readable medium storing a plurality of instructions for controlling a computer to perform the steps of:
    receiving at a media server, from a media production or broadcast destination computer, one or more video format parameters of a media production or broadcast destination;
    customizing, by the media server, a transcoding of media based on the video format parameters, wherein the video format parameters include a broadcast system type or media distribution type;
    receiving, at the media server, one or more media parameters and one or more metadata processing parameters of the media production or broadcast destination;
    customizing, by the media server, an application using the one or more media parameters and the one or more metadata processing parameters to provide a customized application;
    transmitting, by the media server, a token and a link to the media production or broadcast destination computer, a token and a link to the media server;
    detecting, by the media server, an access of the link by the media production or broadcast destination;
    downloading, by the media server, the customized application with an application programming interface (API) from the media server to the media production or broadcast destination computer; and
    periodically receiving at the media server polling of the API by the customized application for user generated content (UGC).

9. The computer product of claim 8 wherein the video format parameters include at least one of a bit rate, a frame rate, an aspect ratio, an orientation, an audio sampling rate, or a combination thereof.

10. The computer product of claim 8 wherein the non-transitory, computer readable medium further comprises instructions for controlling the computer to perform the steps of:
receiving, from the media production or broadcast destination, one or more custom parameters for media;
receiving new UGC;
transcoding the new UGC using the one or more custom parameters to generate transcoded new UGC; and
downloading the transcoded new UGC to the media production or broadcast destination.

11. The computer product of claim 10 wherein the non-transitory, computer readable medium further comprises instructions for controlling the computer to perform the steps of:
receiving a scan path to a media destination at the media production or broadcast destination computer;
customizing the customized application with the scan path; and
directing, by the customized application, the transcoded new UGC to the media destination indicated by the scan path.

12. The computer product of claim 8 wherein the non-transitory, computer readable medium further comprises instructions for controlling the computer to perform the steps of:
designating a URL for an event associated with the media production or broadcast destination computer, the URL indicating a bubble;
publishing the URL for the event to one or more users; and
receiving the UGC at the bubble indicated by the URL.

13. A system for providing user generated content (UGC) to a media production or broadcast destination for inclusion in a broadcast or other media distribution, the system comprising:
a media production or broadcast destination computer;
a media server;
a media server non-transitory, computer readable medium storing a plurality of instructions for controlling the media server to perform the following steps:
receiving, at the media server, from the media production or broadcast destination computer, one or more video format parameters of a media production or broadcast destination;
customizing, by the media server, a transcoding of media based on the video format parameters;
receiving, at the media server, one or more media parameters and one or more metadata processing parameters of the media production or broadcast destination computer;
customizing, by the media server, an application using the one or more media parameters and the one or more metadata processing parameters to provide a customized application;
transmitting, by the media server, to the media production or broadcast destination computer, a token and a link to the media server;
detecting, by the media server, an access of the link by the media production or broadcast destination computer;
downloading, by the media server, the customized application with an application programming interface (API) from the media server to the media production or broadcast destination computer; and
periodically receiving polling of the API by the customized application for the user generated content (UGC);
and
a media production or broadcast destination computer non-transitory, computer readable medium storing a plurality of instructions for controlling the media production or broadcast destination computer to perform the following steps:
sending the one or more video format parameters of the media production or broadcast destination of a broadcast;
sending the one or more media parameters and the one or more metadata processing parameters of the media production or broadcast destination computer;
accessing the link;
downloading the customized application with the API; and
periodically polling the API for UGC.

14. The system of claim 13 wherein the media server non-transitory, computer readable medium further stores a plurality of instructions for controlling the media server to perform the following steps:
designating a URL for an event associated with the media production or broadcast destination computer, the URL indicating a bubble;
publishing the URL for the event to one or more users; and
receiving the UGC at the bubble indicated by the URL.

15. The system of claim 14 further comprising:
a user computing device;
a user computing device non-transitory, computer readable medium storing a plurality of instructions for controlling the user computing device to perform the following steps:
obtaining media content; and
uploading the media content to the bubble using the URL.

16. The system of claim 13 wherein the video format parameters include at least one of a bit rate, a frame rate, an aspect ratio, an orientation, an audio sampling rate, a broadcast system type, a media distribution system type, or a combination thereof.

17. The system of claim 13 wherein the media server non-transitory, computer readable medium further comprises instructions for controlling the media server to perform the steps of:
receiving, from the media production or broadcast destination computer, one or more custom parameters for media;
receiving new UGC;
transcoding the new UGC using the one or more custom parameters to generate transcoded new UGC; and
downloading the transcoded new UGC to the media production or broadcast destination computer.

18. The system of claim 17 wherein the media server non-transitory, computer readable medium further comprises instructions for controlling the media server to perform the steps of:
receiving a scan path to a media destination at the media production or broadcast destination computer;
customizing the customized application with the scan path; and
directing, by the customized application, the transcoded new UGC to the media destination indicated by the scan path.

19. The system of claim 13 wherein the media server non-transitory, computer readable medium further comprises instructions for controlling the media server to perform the steps of:
  designating a URL for an event associated with the media production or broadcast destination computer, the URL indicating a bubble;
  publishing the URL for the event to one or more users; and
  receiving the UGC at the bubble indicated by the URL.

20. The system of claim 13 wherein the media server includes a separate polling server for periodically receiving polling of the API by the customized application for the user generated content (UGC).

* * * * *